(12) United States Patent
Deng et al.

(10) Patent No.: US 7,619,816 B2
(45) Date of Patent: Nov. 17, 2009

(54) STRUCTURES FOR POLARIZATION AND BEAM CONTROL

(75) Inventors: Xuegong Deng, Piscataway, NJ (US); Jian Wang, Orefield, PA (US); Feng Liu, Allentown, PA (US)

(73) Assignee: API Nanofabrication and Research Corp., Somerset, NJ (US)

( * ) Notice: Subject to any disclaimer, the term of this patent is extended or adjusted under 35 U.S.C. 154(b) by 233 days.

(21) Appl. No.: 11/265,813

(22) Filed: Nov. 3, 2005

(65) Prior Publication Data
US 2006/0127829 A1 Jun. 15, 2006

Related U.S. Application Data

(60) Provisional application No. 60/636,303, filed on Dec. 15, 2004.

(51) Int. Cl.
G02B 5/30 (2006.01)
(52) U.S. Cl. ...................................... 359/484; 359/486
(58) Field of Classification Search ................. 359/486, 359/495, 569, 484
See application file for complete search history.

(56) References Cited

U.S. PATENT DOCUMENTS

| | | | |
|---|---|---|---|
| 4,009,933 A | 3/1977 | Firester | |
| 4,289,381 A * | 9/1981 | Garvin et al. | ............ 427/163.1 |
| 4,385,975 A | 5/1983 | Chu et al. | |
| 4,688,897 A | 8/1987 | Grinberg et al. | |
| 4,712,881 A * | 12/1987 | Shurtz et al. | ................. 359/352 |
| 5,119,231 A | 6/1992 | Nelson et al. | |
| 5,196,953 A | 3/1993 | Yeh et al. | |

(Continued)

FOREIGN PATENT DOCUMENTS

DE 3412958 A1 10/1985

(Continued)

OTHER PUBLICATIONS

Bokor et al. "Achromatic phase retarder by slanted illumination of a dielectric grating with period comparable with the wavelength." Applied Optics, 40:13, pp. 2076-2080, May 1, 2001.

(Continued)

*Primary Examiner*—Ricky D Shafer
(74) *Attorney, Agent, or Firm*—Fish & Richardson P.C.

(57) ABSTRACT

In certain aspects, the invention features articles that have a first layer including a plurality of rows of a first material extending along a first direction, the rows being spaced apart from each other and a center of each adjacent row being separated by a distance less than a wavelength $\lambda$, and a second layer supported by the first layer, the second layer including a second material. The first layer is configured to transmit about 50% or more of radiation of wavelength $\lambda$ having a first polarization state incident on the first layer along a path and to specularly reflect about 80% or more of radiation of wavelength $\lambda$ having a second polarization state incident on the first layer along the path, the first and second polarization states being orthogonal. The second layer is configured so that the article specularly reflects about 10% or less of the radiation of wavelength $\lambda$ having the second polarization incident on the article along the path, where the path intersects the first and second layers.

38 Claims, 14 Drawing Sheets

U.S. PATENT DOCUMENTS

| | | | |
|---|---|---|---|
| 5,245,471 A | 9/1993 | Iwatsuka et al. | |
| 5,282,121 A | 1/1994 | Bornhorst et al. | |
| 5,375,012 A | 12/1994 | Borrelli et al. | |
| 5,377,044 A | 12/1994 | Tomono et al. | |
| 5,383,053 A | 1/1995 | Hegg et al. | |
| 5,504,603 A | 4/1996 | Winker et al. | |
| 5,638,197 A | 6/1997 | Gunning et al. | |
| 5,748,368 A | 5/1998 | Tamada et al. | |
| 5,772,905 A | 6/1998 | Chou | |
| 5,851,849 A | 12/1998 | Comizzoli et al. | |
| 5,852,688 A | 12/1998 | Brinkman et al. | |
| 6,057,901 A | 5/2000 | Xu | |
| 6,122,103 A | 9/2000 | Perkins et al. | |
| 6,185,019 B1 | 2/2001 | Hobbs et al. | |
| 6,208,463 B1 | 3/2001 | Hansen et al. | |
| 6,234,634 B1 | 5/2001 | Hansen et al. | |
| 6,243,199 B1 | 6/2001 | Hansen et al. | |
| 6,288,840 B1 | 9/2001 | Perkins et al. | |
| 6,375,870 B1 | 4/2002 | Visovsky et al. | |
| 6,424,436 B1 * | 7/2002 | Yamanaka | 359/15 |
| 6,447,120 B1 | 9/2002 | Hansen et al. | |
| 6,519,016 B1 | 2/2003 | Ichihashi et al. | |
| 6,563,582 B1 | 5/2003 | Chun | |
| 6,576,053 B1 | 6/2003 | Kim et al. | |
| 6,585,378 B2 | 7/2003 | Kurtz et al. | |
| 6,613,695 B2 | 9/2003 | Pomarede et al. | |
| 6,618,104 B1 | 9/2003 | Date et al. | |
| 6,661,952 B2 | 12/2003 | Simpson et al. | |
| 6,665,119 B1 * | 12/2003 | Kurtz et al. | 359/486 |
| 6,692,797 B1 | 2/2004 | Owen et al. | |
| 6,785,050 B2 | 8/2004 | Lines et al. | |
| 6,805,445 B2 | 10/2004 | Silverstein et al. | |
| 6,906,782 B2 | 6/2005 | Nishi | |
| 6,909,473 B2 | 6/2005 | Mi et al. | |
| 6,927,915 B2 * | 8/2005 | Nakai | 359/569 |
| 6,947,215 B2 | 9/2005 | Hoshi | |
| 7,009,768 B2 * | 3/2006 | Sakamoto | 359/486 |
| 7,046,441 B2 * | 5/2006 | Huang et al. | 359/486 |
| 7,064,899 B2 * | 6/2006 | Te Kolste et al. | 359/569 |
| 7,075,722 B2 * | 7/2006 | Nakai | 359/571 |
| 7,158,302 B2 * | 1/2007 | Chiu et al. | 359/486 |
| 7,203,001 B2 * | 4/2007 | Deng et al. | 359/486 |
| 7,268,946 B2 * | 9/2007 | Wang | 359/569 |
| 2001/0051443 A1 | 12/2001 | Koo | |
| 2002/0003661 A1 * | 1/2002 | Nakai | 359/569 |
| 2002/0003664 A1 | 1/2002 | Mearini et al. | |
| 2002/0012172 A1 | 1/2002 | Steinberg et al. | |
| 2002/0191880 A1 | 12/2002 | Borrelli et al. | |
| 2003/0022425 A1 | 1/2003 | Tungare | |
| 2003/0026575 A1 | 2/2003 | Lempkowski | |
| 2003/0156325 A1 | 8/2003 | Hoshi | |
| 2003/0227597 A1 | 12/2003 | Silverstein et al. | |
| 2004/0036961 A1 | 2/2004 | McGuire | |
| 2004/0043149 A1 | 3/2004 | Gordon et al. | |
| 2004/0208994 A1 | 10/2004 | Harkonen et al. | |
| 2004/0218270 A1 | 11/2004 | Wang | |

FOREIGN PATENT DOCUMENTS

| | | |
|---|---|---|
| GB | 2355727 | 5/2001 |
| JP | 02-230203 | 9/1990 |
| JP | 07-005316 | 1/1995 |
| JP | 09-090122 | 4/1997 |
| JP | 11-014814 | 1/1999 |
| JP | 2000-284117 | 10/2000 |
| JP | 2003-066229 | 5/2003 |
| WO | WO 99/18458 | 4/1999 |
| WO | WO 9918458 A1 | 4/1999 |

OTHER PUBLICATIONS

Cescato et al. "Holographic quarterwave plates." Applied Optics, 29:22, pp. 3286-3290, Aug. 1, 1990.

Enger et al. "Optical elements with ultrahigh spatial-frequency surface corrugations." Applied Optics, 22:20, pp. 3220-3228, Oct. 15, 1983.

Flanders, Dale C. "Submicrometer periodicity gratings as artificial anisotropic dielectrics." Appl. Phys. Lett., 42:6, pp. 492-494, Mar. 15, 1983.

Guo, L. Jay. "Recent progress in nanoimprint technology and its applications." Journal of Physics D: Applied Physics. 37,pp. R123-R141, 2004.

Hausmann et al. "Rapid Vapor Deposition of Highly Conformal Silica Nanolaminates." Science. 298, pp. 402-406, Oct. 11, 2002.

Kikuta et al. "Archromatic quarter-wave plates using the dispersion of form birefringence." Applied Optics. 36:7, pp. 1566-1572, Mar. 1, 1997.

Lugmair et al. "New Tris (tert-butoxy)silixy Complexes of Aluminum and Their Transformation to Homogeneous Aluminosilicate Materials via Low-Temperature Thermolytic Pathways." Chem. Mater., 14, pp. 888-898, 2002.

Tyan et al. "Design, fabrication, and characterization of form-birefringent multilayer polarizing beam splitter." J. Opt. Soc. Am. A, 14:7, pp. 1627-1636, Jul. 1997.

Tyan et al. "Polarizing beam splitter based on the anisotropic spectral relectivity characteristic of form-birefringent multiplayer gratings." Optics Letters, 21:10, 761-763, May 15, 1996.

Tyan et al. "Subwavelength Multilayer Binary Grating Design for Implementing Photonic Crystals." OSA Tech Digest Series, 9, Topical Meeting on Quantum Optoelectronics, 1997.

Zaitsu et al. "Optical thin films consisting of nanoscale laminated layers." Appl. Phys. Lett., 80:14, pp. 2442-2444, Apr. 8, 2002.

Kramar J.A., et al., "Granting pitch measurements with molecular measuring machine", Proc. SPIE, Jul. 1999, vol. 3806, pp. 46-53, particularly p. 48.

Colburn, M., et al., "Step and Flash Imprint Lithography: A New Approach to High Resolution Patterning", Proc. SPIE, (Mar. 1999) vol. 3676, pp. 379-389., see pp. 379-380 in particular.

Kim et al., "Design of a grating-based thin-film filter for broadband spectropolarmetry", Applied Optics, vol. 42, No. 31, pp. 6321-6326, Nov. 1, 2003.

Sato et al., "Fabrication Techniques and Characteristics of Al-SiO$_2$ Laminated Optical Polarizers", IEEE Journal of Quantum Electronics, vol. 29, No. 1, pp. 175-181, Jan. 1993.

Stockley et al., "High-speed analog achromatic intensity modulator", Optical Society of America—Optical Letters, vol. 19, No. 10, pp. 758-760, May 15, 1994.

Carl Buhrer, "Four waveplate dual tuner for birefringent filters and multiplexers", Applied Optics, vol. 26, No. 17, pp. 3628-3632, Sep. 1, 1987.

Gu et al., "Form birefringence dispersion in periodic layered media", Optical Society of America—Optical Letters, vol. 21, No. 7, pp. 504-506, Apr. 1, 1996.

Boulbry et al., "Polarization errors associated with zero-order achromatic quarter-wave plates in the whole visible spectral range" Optics Express, vol. 9, No. 5, pp. 225-235.

Nordin et al., "Broadband form birefringent quarter-wave plate of the mid-infrared wavelength region", Optics Express, vol. 5, No. 8, pp. 163-168, Oct. 11, 1999.

Masterson et al. "Novel Polarization Interference Filters For Wide Spectral Tuning of an Optical Null", Boulder Nonlinear Systems, 450 Courtney Way, Lafayette Colorado 80026.

Kitagawa et al., Form birefringence of SiO$_2$/Ta$_2$O$_5$ periodic multilayers, Applied Optics, vol. 24, No. 20, pp. 3359-3362, Oct. 15, 1985.

Pancharatnam, "Achromatic Combinations of Birefringent Plates—Part II. An Achromatic Quarter-Wave Plate", Memoir No. 71 of the Raman Research Institute, Bangalore, pp. 137-144, Mar. 5, 1955.

Wang et al., "High-performance optical retarders based on all-dielectric immersion nanogratings", Optical Society of America—Optical Letters, vol. 30, No. 14, pp. 1864-1866, Jul. 15, 2005.

Deng et al., "Achromatic wave plates for optical pickup units fabricated by use of imprint lithography", Optical Society of America—Optical Letters, vol. 30, No. 19, pp. 2616-2616, Oct. 1, 2005.

Kleemann et al., "Area-coded effective medium structures, a new type of grating design", Optical Society of America—Optical Letters, vol. 30, No. 13, pp. 1617-1619, Jul. 1, 2005.

Wang et al., "High-performance nanowire-grid polarizers", Optical Society of America—Optical Letters, vol. 30, No. 2, pp. 195-197, Jan. 15, 2005.

Wang et al., "Monolithically Integrated Isolators Based on Nanowire-Grid Polarizers", IEEE Photonics Technology Letters, vol. 17, No. 2, pp. 396-398, Feb. 2005.

Suleski et al. "Fabrication Trends for Free-Space Microoptics", Journal of Lightwave Technology, vol. 23, No. 2, Feb. 2005.

Shareef et al., "Subatomospheric chemical vapor deposition ozone/TEOS process for $SiO_2$ trench filling", American Vacuum Society, Jul./Aug. 1995.

Rey et al., "Monte Carlo low pressure deposition profile simulations", American Vacuum Society, May/Jun. 1991.

Lutze et al., "Spin-on-glass for 200nm trench isolation structures", J.Micromech. Microeng, pp. 46-51, (1991).

Lu et al., "Trench filling by ionized metal physical vapor deposition", American Vacuum Society, pp. 2652-2663, Sep./Oct. 2001.

Lee et al., "Arbitrary structuring of two-dimensional photonic crystals by use of phase-only Fourier gratings", Optical Society of America, vol. 29, No. 21, Nov. 1, 2004.

Doshi et al., "Optically Defined Multifunctional Patterning of Photosensitive Thin-Film Silica Mesophases", Science, vol. 290, Oct. 6, 2000.

Zhao et al., "Creation of a three-dimensional optical chain for controllable particle delivery", Optical Society of America—Optical Letters, vol. 30, No. 8, Apr. 15, 2005.

Yeh et al., "Electromagnetic propagation in periodic stratified media. I. General theory", Optical Society of America, vol. 67, No. 4, Apr. 1977.

Xu et al., "Single-substrate birefringent computer-generated holograms", Optical Society of America—Optical Letters, vol. 21, No. 7, Apr. 1, 1996.

Weber et al., "Giant Birefringent Optics in Multilayer Polymer Mirrors", Science, vol. 287, Mar. 31, 2000.

Shiraishi et al., "Experimental verification of a form-birefringent polarization splitter", American Institute of Physics, vol. 58, No. 3, Jan. 21, 1991.

Stork et al., "Artificial distribution-index media fabrication by zero-order gratings." Optical Society of America, vol. 16, No. 24, Dec. 15, 1991.

Sinclair et al., "Synthetic infrared spectra", Optical Society of America—Optical Letters, vol. 22, No. 13, Jul. 1, 1997.

Shiraishi et al., "Spatial walk-off polarizer utilizing artificial anisotropic dielectrics", Optical Society of America—Optical Letters, vol. 15, No. 9, May 1, 1990.

Noda et al., "Polarization mode control of two-dimensional photonic crystal laser by unit cell structure design" Science, vol. 293, Aug. 10, 2001.

Nieuborg et al., "Polarization-selective diffractive optical elements with an index-matching gap material", Applied Optics, vol. 36, No. 20, Jul. 10, 1997.

Mirotznik et al., "Design of two-dimensional polarization-selective diffractive optical elements with form-birefringent microstructures", Applied Science, vol. 43, No. 32, Nov. 10, 2004.

Lopez et al., "Wave-plate polarization beam splitter based on a form-birefringent multilayer grating", Optical Society of America, vol. 23, No. 20, Oct. 15, 1998.

Liu et al., "Realization of a polarizer employing the combined effects of birefringence and diffraction", Optical Society of America—Optical Letters, vol. 22, No. 19, Oct. 1, 1997.

Liu et al., "Multilevel binary phase grating polarization device with a birefringent substrate", Optical Society of America—Optical Letters, vol. 20, No. 17, Sep. 1, 1995.

Levy et al., "Design, fabrication and characterization of subwavelength computer-generated holograms for spot array generation", Optics Express, vol. 12, No. 22, Nov. 1, 2004.

Leger et al., "Diffractive optical element for mode shaping of a Nd:YAG laser", Optical Society of America—Optical Letters, vol. 19, No. 2, Jan. 15, 1994.

Felbacq et al., "Left-handed media and homogenization of photonic crystals", Optical Society of America—Optical Letters, vol. 30, No. 10, May 15, 2005.

Johnson et al., "Phase encryption of biometrics in diffractive optical elements", Optical Society of America—Optical Letters, vol. 21, No. 16, Apr. 15, 1996.

Grann et al., "Artificial uniaxial and biaxial dielectrics with us of two-dimensional subwavelength binary gratings", Optical Society of America, vol. 11, No. 10, Oct. 1994.

Glaser et al., "Beam switching with binary single-order diffractive gratings", Optical Society of America—Optical Letters, vol. 23, No. 4, Dec. 15, 1998.

Deng et al., "Generic three-dimensional wavelength router based on cross connects of multi-layer diffractive elements", Proceeding of SPIE, vol. 4292 (2001).

Deng et al., "Design of cascaded diffractive phase elements for three-dimensional multiwavelength optical interconnects", Optical Society of America—Optical Letters, vol. 25, No. 14, Jul. 15, 2000.

Chang et al., "Multiple-phase retrieval for optical security systems by use of random-phase encoding", Applied Optics vol. 41, No. 23, Aug. 10, 2002.

Auton, "Infrared transmission polarizers by photolithography", Applied Optics, vol. 6, No. 6, Jul. 1967.

Tamada et al., "Al wire-grid polarizer using the s-polarization resonance effect at the 0.8-µm-wavelenth band", Optical Society of America—Optical Letters, vol. 22, No. 6, Mar. 15, 1997.

Bennett, "Polarizers (Chapter 3 of Handbook of Optics, Edited by Bass et al.)", McGraw-Hill, Inc., ISBN 0-07-047974-7, (1995).

Haggans et al., "Effective-medium theory of zeroth order lamellar gratings in conical mountings", J. Opt. Soc. Am. A, vol. 10, pp. 2217-2225 (1993).

Kikuta et al., "Ability and Limitations of effective medium theory for subwavelength gratings", Opt. Rev., vol. 2, pp. 93-99, (1995).

Gori, "Measuring Stokes parameters by means of a polarization grating", Opt. Lett., vol. 24, No. 9, pp. 584, (1999).

Li, "Multilayer modal method for diffraction gratings of arbitrary profile, depth, and permittivity", J. Opt. Soc. Am. A, vol. 10, No. 12, pp. 2581, (1993).

Gaylord et al., "Analysis and applications of optical diffraction gratings", Proc. IEEE, vol. 73, No. 5, (1985).

Pezzaniti et al., "Angular dependence of polarizing beam-splitter cubes", Applied Optics vol. 33, Issue 10, pp. 1916-1929, Apr. 1994.

Wang et al., "Fabrication of a new broadband waveguide polarizer with a double-layer 190nm period metal-gratings using nanoimprint lithography", American Vacuum Society, vol. 17, No. 6, Nov./Dec. 1999.

Schnabel et al., "Study on polarizing visible light by sub-wavelength-period metal-stripe gratings", Opt. Eng. vol. 38, No. 2, pp. 220-226, Figure 8 and related text, Feb. 1999.

Doumukia et al., "An aluminum-wire grid polarizer fabricated on a gallium-arsenide photodiode", Appl. Phys. Lett. vol. 71, No. 5, pp. 686-688, Figure 2 and related text, Aug. 4, 1997.

Definitions—www.profluxpolarizer.com, pp. 1-2 (1995).

E.W. Van Stryland et al., Handbook of Optics, Devices, Measurements & Properties, 3.10 vol. 2, $2^{nd}$ Ed., (1995).

David J. Griffiths, "Electromagnetic Waves in Nonconducting Media" Introduction to Electrodynamics, $2^{nd}$ Ed., p. 363, (1989).

* cited by examiner

STRUCTURES FOR POLARIZATION AND BEAM CONTROL

CROSS-REFERENCE TO RELATED APPLICATIONS

This application claims priority under 35 U.S.C. § 119(e)(1) to U.S. Provisional Application No. 60/636,303, entitled "MULTILAYER STRUCTURES FOR POLARIZATION AND BEAM CONTROL," and filed on Dec. 15, 2004, the entire contents of which are incorporated herein by reference.

TECHNICAL FIELD

This disclosure relates to optical devices and systems that use optical devices.

BACKGROUND

Optical devices and systems are commonly used where manipulation of light is desired. Examples of optical devices include lenses, polarizers, optical filters, antireflection films, optical retarders (e.g., waveplates), and beam splitters (e.g., polarizing and non-polarizing beam splitters). Sub-wavelength structures may be used to control properties of optical beams such as polarization. Articles that are sensitive to the polarization of a beam may include sub-wavelength structure.

SUMMARY

In general, in one aspect, the invention features articles that include a first layer including a plurality of rows of a first material extending along a first direction, the rows being spaced apart from each other and a center of each adjacent row being separated by a distance less than a wavelength $\lambda$, and a second layer supported by the first layer, the second layer comprising a second material, wherein the first layer is configured to transmit about 50% or more of radiation of wavelength $\lambda$ having a first polarization state incident on the first layer along a path and to specularly reflect about 80% or more of radiation of wavelength $\lambda$ having a second polarization state incident on the first layer along the path, the first and second polarization states being orthogonal, and the second layer is configured so that the article specularly reflects about 10% or less of the radiation of wavelength $\lambda$ having the second polarization incident on the article along the path, where the path intersects the first and second layers.

Embodiments of the articles may include one or more of the following features and/or features of other aspects.

The second layer can include a plurality of portions including the second material, the portions being spaced apart from each other and a center of each adjacent portion being separated by a distance more than about $\lambda$ (e.g., more than about $2\lambda$, more than about $5\lambda$, more than about $10\lambda$). The second layer can include a plurality of portions including the second material, the portions being spaced apart from each other and a center of each adjacent portion being separated by a distance less than about $50\lambda$ (e.g., less than about $40\lambda$, less than about $30\lambda$, less than about $20\lambda$). The plurality of portions of the second material can extend along a second direction. Portions that include the second material can be rows that extend along the second direction. The rows that include the second material can have a rectangular or trapezoidal profile. The portions including the second material can be periodically spaced in a direction perpendicular to the second direction.

The rows including the second material have a width of about 1 µm or more (e.g., about 2 µm or more, about 5 µm or more). In some embodiments, the rows including the second material have a width of about 10 µm or less (e.g., about 8 µm or less).

The center of adjacent portions can be separated by a distance of about 1 µm or more (e.g., about 2 µm or more, about 3 µm or more, about 4 µm or more, about 5 µm or more). In some embodiments, the center of adjacent portions are separated by a distance of about 50 µm or less (e.g., about 40 µm or less, about 30 µm or less, about 20 µm or less).

The plurality of portions in the second layer can each include a plurality of rows of the second material extending along the first direction, the rows of the second material being spaced apart from each other and a center of each adjacent row being separated by a distance less than $\lambda$. The center of each adjacent row of the second material can be separated by a distance of about 400 nm or less (e.g., about 300 nm or less, about 250 nm or less, about 200 nm or less, about 180 nm or less, about 160 nm or less). In some embodiments, the center of each adjacent row of the second material is separated by a distance in a range from about 70 nm to about 300 nm. The rows of the first material in the first layer can be continuous with the rows of the second material in the second layer.

The second layer can have a thickness of about 1,000 nm or less (e.g., about 800 nm or less, about 600 nm or less, about 500 nm or less, about 400 nm or less, about 300 nm or less, about 200 nm or less). In certain embodiments, the second layer has a thickness of about 10 nm or more (e.g., about 20 nm or more, about 30 nm or more, about 40 nm or more, about 50 nm or more, about 60 nm or more, about 70 nm or more, about 80 nm or more).

The first and second materials can be the same or different. The second material can be a dielectric material. In some embodiments, the second material includes at least one material selected from a group including $SiO_2$, $SiN_x$, $Si$, $Al_2O_3$, $ZrO_2$, $Ta_2O_5$, $TiO_2$, $HfO_2$, $Nb_2O_5$, and $MgF_2$. In certain embodiments, the second material is a metallic material. The second material can include at least one metal selected from the group including Al, Au, Ag, Cr and Cu.

Portions of the second layer between the portions including the second material can include a third material different from the second material. The third material can be a dielectric material. The third material can be a nanolaminate material. In some embodiments, the second material is a metallic material. The third material can have a refractive index at $\lambda$ that is approximately equal to an effective refractive index of the rows comprising the second material for radiation of wavelength $\lambda$ having the second polarization state propagating along the axis. In certain embodiments, the second layer is a continuous layer.

The second layer can be configured so that the article specularly reflects about 8% or less (e.g., about 5% or less, about 4% or less, about 3% or less, about 2% or less) of the radiation of wavelength $\lambda$ having the second polarization incident on the article along the path.

The rows of the first material can be periodically spaced in a direction orthogonal to the first direction.

The first material can be a dielectric material. In some embodiments, the first material includes at least one material selected from a group including $SiO_2$, $SiN_x$, $Si$, $Al_2O_3$, $ZrO_2$, $Ta_2O_5$, $TiO_2$, $HfO_2$, $Nb_2O_5$, and $MgF_2$. The first material can be a nanolaminate material.

In certain embodiments, the first material is a metallic material. The first layer can include a plurality of rows of a dielectric material extending along the first direction, the rows of the dielectric material alternating with the rows of the first material. The first material can include at least one metal selected from the group including Al, Au, Ag, Cr and Cu.

The rows of the first material can have a width of about 200 nm or less (e.g., about 150 nm or less, about 100 nm or less, about 80 nm or less, about 60 nm or less, about 50 nm or less). In some embodiments, the rows of the first material have width in a range from about 50 nm to about 200 nm. Each adjacent rows of the first material are separated by a trench having a width in a range from about 50 nm to about 300 nm.

The first layer can have a thickness of about 10 nm or more (e.g., about 20 nm or more, about 50 nm or more, about 70 nm or more, about 100 nm or more). In certain embodiments, the first layer has a thickness of about 1,000 nm or less (e.g., about 800 nm or less, about 600 nm or less, about 500 nm or less, about 400 nm or less). The first and second layers can have a combined thickness of about 5 μm or less (e.g., about 3 μm or less, about 2 μm or less, about 1 μm or less, about 800 m or less, about 500 nm or less).

The article can include a third layer between the first layer and the second layer. The third layer can include the first material. The rows of the first material in the first layer can be continuous with the first material in the third layer. The first and second layers can be separated by a distance of about 5 μm or less (e.g., about 3 μm or less, about 2 μm or less, about 1 μm or less, about 800 nm or less, about 500 nm or less).

The first layer can be a continuous layer.

The rows of the first material can have a rectangular, trapezoidal, oval, or convex hull profile.

The first layer can transmit about 80% or more (e.g., about 90% or more, about 95% or more) of radiation of wavelength $\lambda$ having the first polarization state incident on the layer along the path. The first the layer can block about 90% or more (e.g., about 95% or more, about 98% or more, about 99% or more) of radiation of wavelength $\lambda$ having the second polarization state incident on the layer along the path.

The first and second polarization states can be linear polarization states. The first and second polarization states can be TM and TE polarization states, respectively. $\lambda$ can be between about 150 nm and about 5,000 nm (e.g., between about 400 nm and about 700 nm, between about 1,200 nm and about 1,700 nm).

The first layer can transmit about 50% or more of radiation of wavelength $\lambda$ having a first polarization state incident on the layer along a path and the layer blocks about 80% or more of radiation of wavelength $\lambda'$ having a second polarization state incident on the layer along the path, wherein $|\lambda-\lambda'|$ is about 50 nm or more (e.g., about 100 nm or more, about 150 nm or more, about 200 nm or more, about 250 nm or more, about 300 nm or more).

The article can further include a substrate, wherein the first layer is supported by the substrate. The substrate can be a planar substrate. The substrate can include a layer of an inorganic glass material. The article can further include an anti-reflection film supported by the substrate.

In a further aspect, the invention features an apparatus including a Faraday rotator and the article positioned relative to the Faraday rotator so that the path intersects the Faraday rotator. The Faraday rotator can rotate incident radiation having the first polarization state propagating along the path by an amount between about 30° and about 60° (e.g., by about 45°). The apparatus can include a polarizer, wherein the Faraday rotator is positioned between the article and the polarizer. In certain embodiments, the apparatus includes an optical isolator including the Faraday rotator and the article. The apparatus can also include a source (e.g., a laser source) of radiation at $\lambda$.

In general, in another aspect, the invention features articles that include a first layer supported by the substrate, the first layer including a plurality of rows of a first material extending along a first direction, the rows being spaced apart from each other and a center of each adjacent row being separated by a distance less than a wavelength $\lambda$, wherein the first layer is configured to transmit about 50% or more of radiation of wavelength $\lambda$ having a first polarization state incident on the first layer along a path and to specularly reflect about 80% or more of radiation of wavelength $\lambda$ having a second polarization state incident on the first layer along the path, the first and second polarization states being orthogonal, and a second layer supported by the first layer, the second layer including a plurality of rows that include a second material extending along a second direction, the rows being spaced apart from each other and a center of each adjacent row being separated by a distance more than $\lambda$, wherein $\lambda$ is in a range from about 150 m to about 5,000 nm.

Embodiments of the articles can include one or more of the following features and/or features of other aspects.

For example, the portions that include the second material can extend along a second direction. The second direction can be parallel to the first direction. The portions can be rows extending along the second direction. The plurality of portions in the second layer each can include a plurality of rows of the first material extending along the first direction, the rows of first material being spaced apart from each other and a center of each adjacent row being separated by a distance less than $\lambda$.

In general, in another aspect, the invention features articles that include a first layer including a plurality of rows of a first material extending along a first direction, the rows being spaced apart from each other and a center of each adjacent row being separated by a distance less than a wavelength $\lambda$, and a second layer supported by the first layer, the second layer including a plurality of portions that include a second material extending along a second direction, the portions being spaced apart from each other and a center of each adjacent portion being separated by a distance more than $\lambda$, wherein the plurality of portions in the second layer each include a plurality of rows of the second material extending along the first direction, the rows of the second material being spaced apart from each other and a center of each adjacent row being separated by a distance less than $\lambda$, and wherein $\lambda$ is in a range from about 150 nm to about 5,000 nm. Embodiments of the articles can include one or more of the features of other aspects.

In general, in a further aspect, the invention features articles that include a first layer including a plurality of rows of a first material extending along a first direction, the rows being spaced apart from each other and a center of each adjacent row being separated by a distance less than a wavelength $\lambda$, wherein the first layer is configured to transmit about 50% or more of radiation of wavelength $\lambda$ having a first polarization state incident on the first layer along a path and to specularly reflect about 80% or more of radiation of wavelength $\lambda$ having a second polarization state incident on the first layer along the path, the first and second polarization states being orthogonal, and a second layer supported by the first layer, the second layer including a first plurality of rows that include a second material and a second plurality of rows of a third material different from the second material, where rows of the first plurality alternate with rows of the second plurality and a center of each adjacent row of the first plurality is separated by a distance more than $\lambda$, wherein $\lambda$ is in a range from about 150 nm to about 5,000 nm. Embodiments of the articles can include one or more of the features of other aspects.

In general, in another aspect, the invention features articles that include a layer including a plurality of portions that include a metallic material, the plurality of portions being spaced apart from each other so each portion is spaced from an adjacent portion by a distance in a range from about 1 µm to about 50 µm, wherein the metallic material in each portion is arranged in a plurality of rows extending along a first direction, the metallic rows being spaced apart from each other and a center of each row being spaced about 500 nm or less from an adjacent row.

Embodiments of the articles can include one or more of the following features and/or features of other aspects.

For example, spaces between adjacent portions can be filled with a first dielectric material. Spaces between adjacent metallic rows can be filled with a second dielectric material. The first and second dielectric materials can be the same. The first dielectric material can have a refractive index at a wavelength $\lambda$ that is approximately equal to an effective refractive index of the portions of metallic material for radiation of wavelength $\lambda$ having being polarized parallel to the first direction, where $\lambda$ is in a range from about 150 nm to about 5,000 nm. The first dielectric material can be a nanolaminate material.

In general, in a further aspect, the invention features methods that include forming a layer including a plurality of rows of a first material extending along a first direction, the rows being spaced apart from each other and a center of each adjacent row being separated by a distance less than a wavelength $\lambda$, and removing portions of the rows of the first material to form a plurality of trenches in the layer, the trenches having a width of about $\lambda$ or more, where $\lambda$ is in a range from about 150 nm to about 5,000 nm.

Implementations of the methods can include one or more of the following features and/or features of other aspects.

The method can further include depositing a second material in the plurality of trenches. The second material can be deposited using atomic layer deposition. The first and second materials can be different. The first material can be a metallic material and the second material can be a dielectric material.

The portions of the first layer can be removed by etching (e.g., reactive ion etching) the first layer. The first material can be a metallic material.

The trenches can have a depth less than a thickness of the layer. The trenches can be periodically spaced along at least one direction. The trenches can be periodically spaced along a direction perpendicular to the first direction.

In general, in a further aspect, the invention features articles that include a layer including a plurality of rows of a first material extending along a first direction, the rows being spaced apart from each other and a center of each adjacent row being separated by a distance less than a wavelength $\lambda$ so that for radiation of wavelength $\lambda$ propagating along a path through the layer, the layer has a first effective index of refraction, $n_1$, for the radiation having a first polarization state and the layer has second effective index of refraction, $n_2$, for the radiation having a second polarization state orthogonal to the first polarization state, where $n_1$ and $n_2$ are different, and a plurality of trenches formed in a surface of the layer, the trenches extending along a second direction and being spaced apart from each other, where a center of each adjacent trench is separated by a distance more than wavelength $\lambda$, and the trenches are filled with a second material having a refractive index, $n_3$, different from $n_2$.

Embodiments of the articles can include one or more of the following features and/or features of other aspects.

For example, the article can be configured so that for radiation having wavelength $\lambda$ incident on the layer along the path, the article transmits about 50% or more of the incident radiation having the first polarization state along a first direction and transmits about 50% or more of the incident radiation having the second polarization state along one or more directions non-parallel to the first direction. The articles can be configured to diffract about 50% or more of radiation having wavelength $\lambda$ and the second polarization state incident on the article along the path into one or more non-zero diffraction orders. The article can be configured to diffract about 10% or less (e.g., about 8% or less, about 5% or less) of radiation having wavelength $\lambda$ and the first polarization state incident on the article along the path into one or more non-zero diffraction orders. The article can be configured to transmit substantially all of the radiation having wavelength $\lambda$ and the first polarization state incident on the article along the path along the zero order diffraction direction.

The center of each adjacent trench can be separated by a distance of about $2\lambda$ or more (e.g., about $3\lambda$ or more, about $4\lambda$ or more, about $5\lambda$ or more). The center of each adjacent trench can be separated by a distance of about $20\lambda$ or less (e.g., about $15\lambda$ or less, about $10\lambda$ or less).

The center of each adjacent trench can be separated by a distance of about 0.5 µm or more (e.g., about 1 µm or more, about 2 µm or more, about 3 µm or more, about 5 µm or more). In some embodiments, the center of each adjacent trench is separated by a distance of about 20 µm or less (e.g., about 15 µm or less, about 10 µm or less, about 8 µm or less).

The rows of the first material can be periodically spaced in a direction orthogonal to the first direction. The center of each adjacent row of the first material can be separated by a distance of about 400 nm or less (e.g., about 300 nm or less, about 200 nm or less, about 150 nm or less). In some embodiments, the center of each adjacent row of the first material is separated by a distance in a range from about 70 nm to about 300 nm.

The row of the first material can have a rectangular, trapezoidal, oval, or convex hull profile.

The first and second directions can be non-parallel. For example, the first and second directions can be substantially orthogonal to each other.

The layer can be form-birefringent for radiation at wavelength $\lambda$ and $n_1$ can correspond to either the ordinary or extraordinary refractive index of the layer. $n_3$ can be approximately equal to $n_1$.

The first material can be a dielectric material. In some embodiments, the first material can include at least one material selected from a group that includes $SiO_2$, $SiN_x$, $Si$, $Al_2O_3$, $ZrO_2$, $Ta_2O_5$, $TiO_2$, $HfO_2$, $Nb_2O_5$, and $MgF_2$. The first material can be a nanolaminate material.

The second material can be a dielectric material. In some embodiments, the second material includes at least one material selected from a group consisting of $SiO_2$, $SiN_x$, $Si$, $Al_2O_3$, $ZrO_2$, $Ta_2O_5$, $TiO_2$, $HfO_2$, $Nb_2O_5$, and $MgF_2$. The second material can be a nanolaminate material.

The surface including the trenches can have a rectangular, trapezoidal, oval, or convex hull profile.

$\lambda$ can be in a range from about 150 nm to about 5,000 nm (e.g., from about 400 nm to about 700 nm, from about 1,200 nm to about 1,700 nm).

The layer can include a plurality of rows of a third material extending along the first direction, the rows of the third material alternating with the rows of the first material and the first and third materials being different. The third material can have a refractive index at $\lambda$ that is different from $n_1$. The third material can be a dielectric material.

The first and second polarization states can be linear polarization states.

The layer can have a thickness, t, that is about 1 µm or less (e.g., e.g., about 800 nm or less, about 600 nm or less, about 500 nm or less, about 400 nm or less). The trenches can have a depth, d, less than a thickness, t, of the layer.

The article can include a substrate that supports the layer. The substrate can be a planar substrate. The substrate can include an inorganic glass material. In some embodiments, the substrate is substantially transparent for radiation having wavelength λ.

The article can include an anti-reflection film supported by the substrate.

In another aspect, the invention features apparatus that include a first element comprising an article and a second element comprising an article wherein the elements are configured so that the apparatus splits an incident beam at wavelength λ into a pair of beams that emerge from the apparatus spatially separated from one another and propagating along substantially parallel paths. The pair of beams can be substantially polarized orthogonal to each other.

In general, in a further aspect, the invention features articles that include a layer including a plurality of rows of a composite material alternating with rows of a second material, the rows of the composite material and the rows of the second material being arranged to form a diffraction grating, where the diffraction grating has a period greater than a wavelength λ and the composite material is form-birefringent for radiation at wavelength λ.

Embodiments of the articles can include one or more of the following features and/or features of other aspects. For example, the second material can have a refractive index at λ approximately equal to either the ordinary or extraordinary refractive index of the composite material at λ.

In general, in another aspect, the invention features articles that include a polarizing beam splitter including a layer of a material that is form birefringent for radiation having a wavelength λ, wherein the polarizing beam splitter is configured so that for radiation having wavelength λ incident on the polarizing beam splitter along a path, the polarizing beam splitter transmits about 50% or more of the incident radiation having a first polarization state along a first direction and transmits about 50% or more of the incident radiation having a second polarization state along one or more directions non-parallel to the first direction, where the first and second polarization states are orthogonal.

Embodiments of the articles can include one or more of the following features and/or features of other aspects.

The polarizing beam splitter can transmit about 80% or more of the incident radiation having the first polarization state along the first direction. The polarizing beam splitter can transmit about 80% or more of the incident radiation having the second polarization state along the one or more directions non-parallel to the first direction. The polarizing beam splitter can transmit about 80% or more of the incident radiation having the second polarization state along a single of the directions non-parallel to the first direction.

The layer of the material can be in the form of a diffraction grating for radiation having wavelength λ. The first direction can correspond to zeroth order diffraction of the diffraction grating. The one or more directions non-parallel to the first direction can correspond to non-zero order diffraction of the diffraction grating.

Among other advantages, embodiments can provide wire-grid polarizers that have reduced specular reflectivity of block state radiation. The reduction in specular reflectivity of block state radiation can be achieved without substantially affecting the polarizer's transmission of the pass state radiation. In some embodiments, the wire-grid polarizers can operate in the visible portion of the electromagnetic spectrum. The wire-grid polarizers can be broadband polarizers.

Embodiments also include transmissive polarizing beam splitters formed using a form-birefringent medium. The polarizing beam splitters operate by transmitting orthogonal polarization components of an incident beam along different paths.

Embodiments such as wire-grid polarizers and/or transmissive polarizing beam splitters can have a relatively compact form-factor, being formed as thin films on a substrate. Embodiments include monolithic layers having diffractive and/or sub-wavelength structure, providing mechanically robust devices. Furthermore, additional layers can be formed over the monolithic layers, providing compound devices. Large numbers of small components may be efficiently manufactured by, e.g., forming a large area device and dicing it into many smaller devices.

Unless otherwise defined, all technical and scientific terms used herein have the same meaning as commonly understood by one of ordinary skill in the art to which this invention belongs. Other features and advantages of the invention will be apparent from the description and drawings, and from the claims.

DESCRIPTION OF DRAWINGS

Like reference symbols in the various drawings indicate like elements.

DETAILED DESCRIPTION

The disclosure generally relates to articles that are sensitive to and can be used to control properties of electromagnetic (EM) radiation, such as the polarization and/or direction of beams incident on the articles. Examples of EM radiation include the visible region of the EM spectrum, the infrared region, the microwave region, the radiowave region, and/or other regions. In some embodiments, the articles can be sensitive to and/or can be used to control the properties of incident radiation in more than one region of the EM spectrum. In general, the articles can be used to control properties of incident radiation at one or more wavelengths (including a wavelength $\lambda$), and typically include structural features that diffract light at $\lambda$, as well as sub-wavelength structural features. Generally, the structural features that diffract light at $\lambda$ are of similar size or larger than $\lambda$. In embodiments, surfaces with diffractive structural features may be covered with a material that reduces the optical effects of the diffractive structural features for at least one polarization state of incident radiation at $\lambda$.

Figure 1A:
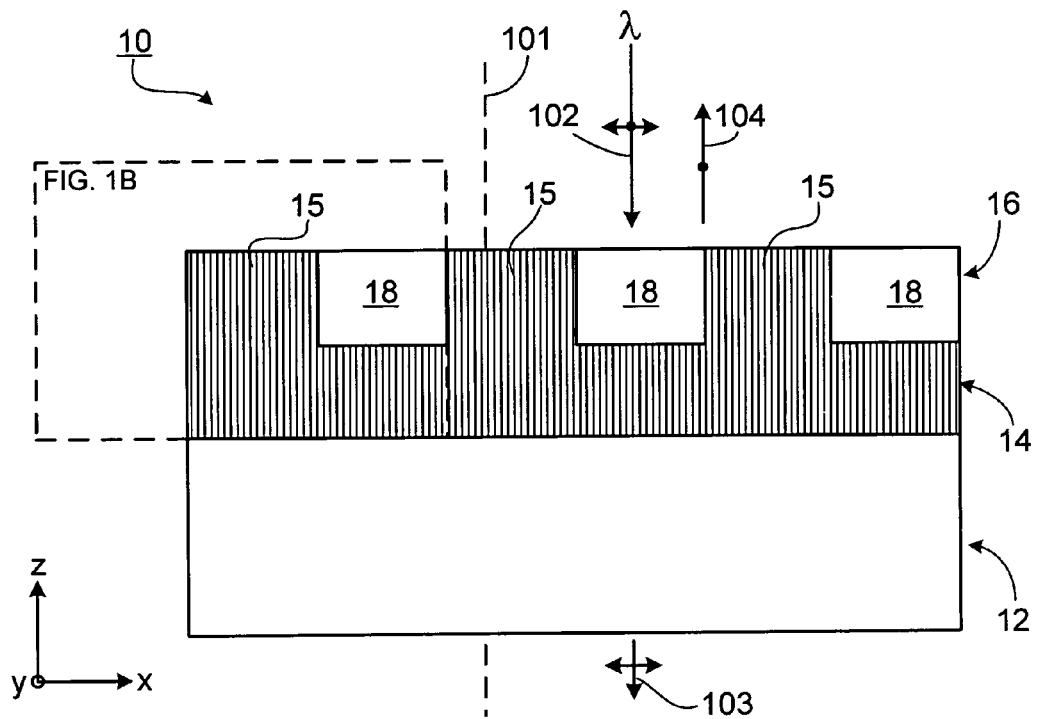
FIG. 1A is a cross-sectional view of an embodiment of a reflective polarizer that includes a sub-wavelength grating layer and a diffractive layer.
Figure 1B:
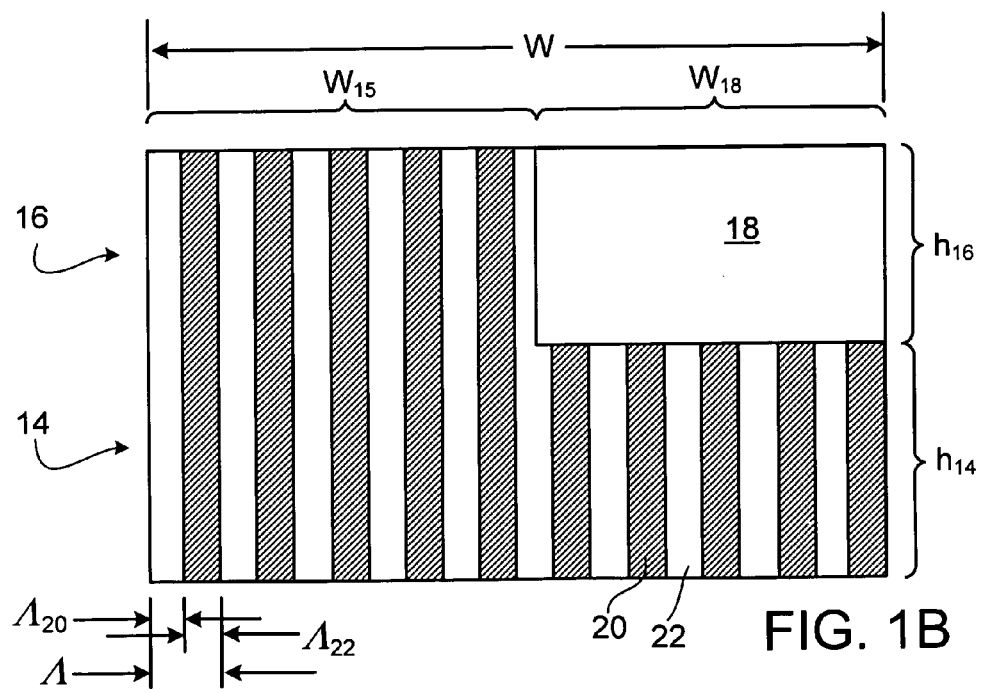
FIG. 1B is a cross-sectional view of a portion of the sub-wavelength grating layer and the diffractive layer of the reflective polarizer shown in FIG. 1A.

Referring to FIGS. 1A and 1B, a reflective polarizer 10 includes a sub-wavelength grating layer 14 and a diffractive layer 16. Sub-wavelength grating layer 14 has alternating portions 20 and 22 which form a sub-wavelength structure for radiation at $\lambda$. Portions 20 are formed from a material that is substantially transmissive at $\lambda$ while portions 22 are formed from a material that is substantially not transmissive at $\lambda$. For example, embodiments designed for operation in the visible or IR regions, portions 20 may be formed from a dielectric material and portions 22 can be formed from a metal. The sub-wavelength structure of layer 14 gives rise to an optical anisotropy for incident radiation at $\lambda$ (e.g., the layer has different optical properties for radiation polarized along the x-axis compared to radiation polarized along the y-axis). As a result, sub-wavelength grating layer 14 linearly polarizes incident radiation 102 of wavelength $\lambda$ propagating parallel to an axis 101, corresponding to the z-axis of the Cartesian coordinate system shown in FIGS. 1A and 1B. In other words, for radiation of wavelength $\lambda$ incident on reflective polarizer 10 propagating parallel to the z-axis, reflective polarizer 10 transmits a relatively large amount of the component of incident radiation plane-polarized in the x-z plane (referred to as pass state polarization), shown as transmitted radiation 103, while blocking a relatively large amount of the component plane-polarized in the y-z plane (referred to as block state polarization), depicted at least in part as reflected radiation 104. A layer transmits a relatively large amount of a component of incident radiation if it transmits about 60% or more (e.g., about 80% or more, about 90% or more, about 95% or more, about 98% or more, about 99% or more) of the incident component. A layer blocks a relatively large amount of a component of incident radiation if it blocks about 60% or more (e.g., about 80% or more, about 90% or more, about 95% or more, about 98% or more, about 99% or more) of the incident component.

Diffractive layer 16 includes alternating portions 15 and 18 which form a diffractive structure for radiation at $\lambda$. Portions 20 and 22 extend from layer 14 into portions 15 of layer 16. Thus, portions 15 also have sub-wavelength structure and are anisotropic for incident radiation at $\lambda$. Portions 18, on the other hand, are formed from a material that is isotropic at $\lambda$ and also transmissive at $\lambda$. As a result, optical properties (e.g., refractive index) of portions 18 are the same for pass and block state radiation.

The composition of portions 15 and 18 are selected so that the refractive index of portions 18, $n_{18}$, is substantially the same as the refractive index of portions 15 for pass state radiation at $\lambda$ (referred to as $n_P$), but differs from the refractive index of portions 15 for block state radiation at $\lambda$ (referred to as $n_B$). As a result, the super-wavelength structure of layer 16 does not substantially affect incident pass state radiation, but does affect incident block state radiation at $\lambda$.

Generally, reflective polarizer 10 blocks a relatively large amount of incident radiation at $\lambda$ having the block state polarization by reflecting and/or absorbing block state radiation. For example, reflective polarizer 10 can reflect about 80% or more (e.g., about 90% or more, about 95% or more, about 98% or more, about 99% or more) of incident radiation at $\lambda$ having the block polarization state. When reflective polarizer 10 reflects a relatively large amount block state radiation, absorption of the block state radiation is relatively low. For example, block state absorption by polarizer 10 can be about 10% or less (e.g., about 5% or less, about 4% or less, about 3% or less, about 2% or less, about 1% or less).

Due to the diffractive structure, layer 16 substantially diffracts and/or scatters reflected block state radiation. This can result in a substantially diffuse reflection of block state radiation with reflective polarizer 10 specularly reflecting a relatively small amount of block state radiation at $\lambda$. For example, reflective polarizer can specularly reflect about 20% or less (e.g., about 15% or less, about 10% or less, about 8% or less, about 5% or less, about 3% or less, about 2% or less, about 1% or less) of the block state radiation.

In certain embodiments, reflective polarizer 10 can absorb a relatively large amount of the incident radiation at $\lambda$ having the block polarization state. For example, reflective polarizer 10 can absorb about 30% or more (e.g., about 40% or more, about 50% or more) of the block state polarization. High absorption of block state radiation can occur, for example, where the material forming portions 22 has relatively high absorption at $\lambda$ (e.g., absorbs about 40% or more incident radiation at $\lambda$, about 50% or more incident radiation at $\lambda$).

In some embodiments, reflective polarizer 10 polarizes radiation at more than one wavelength, such as for a continuous band of wavelengths. For example, reflective polarizer 10 can polarize radiation for a band of wavelengths about 50 nm or more in width (e.g., about 100 nm wide or more, about 200 nm wide or more, about 300 nm wide or more). In certain embodiments, reflective polarizer 10 polarizes incident radiation across substantially the entire visible portion of the electromagnetic spectrum (e.g., for $\lambda$ from about 400 nm to about 700 nm). Alternatively, reflective polarizer 10 can polarize radiation for substantially the entire near infrared portion of the electromagnetic spectrum (e.g., from about 700 nm to 2,000 nm). In certain embodiments, reflective polarizer 100 polarizes radiation for substantially the entire visible and near infrared portions of the electromagnetic spectrum (e.g., from about 400 nm to about 2,000 nm).

Furthermore, while reflective polarizer 10 has been described as polarizing incident radiation propagating parallel to the z-axis (e.g., normally incident on the surface of polarizer 10), polarizer 10 can polarize radiation at $\lambda$ for radiation at non-normal angles of incidence (i.e., for radiation incident on reflective polarizer 10 propagating at an angle $\theta$ with respect to the z-axis, where $\theta$ is non-zero). In certain embodiments, reflective polarizer 10 can polarize radiation incident at more than one angle of incidence, such as for a range of incident angles. For example, in some embodiments, reflective polarizer 10 polarizes radiation incident within a cone of incident angles for $\theta$ of about 10° or more (e.g., about 15° or more, about 20° or more). Note that for non-normal incidence, the pass state corresponds to radiation polarized parallel to the x-z plane, while the block state corresponds to radiation polarized orthogonal to the x-z plane.

Reflective polarizer 10 can have a relatively high extinction ratio, $E_T$, for transmitted radiation at $\lambda$. For transmitted radiation, the extinction ratio refers to the ratio of pass state intensity at $\lambda$ to the block state intensity transmitted by reflective polarizer 10. $E_T$ can be, for example, about 30:1 or more (e.g., about 50:1 or more, about 100:1 or more, about 150:1 or more) at $\lambda$. In certain embodiments where block state transmission is relatively low, $E_T$ can be very high, such as about 1000:1 or more.

Turning now to the structure of reflective polarizer 10, portions 20 and 22 extend along the y-direction, forming a periodic structure consisting of a series of alternating rows of materials that are substantially transmissive at $\lambda$ and materials that are substantially not transmissive at $\lambda$. The rows corresponding to portions 20 have a width $\Lambda_{20}$ in the x-direction, while the rows corresponding to portions 22 have a width $\Lambda_{22}$ in the x-direction. The sub-wavelength grating period, $\Lambda$, equal to $\Lambda_{20}+\Lambda_{22}$, is smaller than $\lambda$ and as a result radiation of wavelength $\lambda$ interacts with sub-wavelength grating layer 14 without encountering significant high-order diffraction that can occur when radiation interacts with periodic structures. For reflective polarizers that operate in the visible portion of the EM spectrum, grating layer 14 is an example of a nanostructured layer.

In general, $\Lambda_{20}$ can be about 0.2 $\lambda$ or less (e.g., about 0.1 $\lambda$ or less, about 0.05 $\lambda$ or less, about 0.04 $\lambda$ or less, about 0.03 $\lambda$ or less, about 0.02 $\lambda$ or less, 0.01 $\lambda$ or less). For example, in some embodiments, $\Lambda_{20}$ is about 200 nm or less (e.g., about 150 nm or less, about 100 nm or less, about 80 nm or less, about 70 nm or less, about 60 nm or less, about 50 nm or less, about 40 nm or less, about 30 nm or less). Similarly, $\Lambda_{22}$ can be about 0.2 $\lambda$ or less (e.g., about 0.1 $\lambda$ or less, about 0.05 $\lambda$ or less, about 0.04 $\lambda$ or less, about 0.03 $\lambda$ or less, about 0.02 $\lambda$ or less, 0.01 $\lambda$ or less). For example, in some embodiments, $\Lambda_{22}$ is about 200 nm or less (e.g., about 150 nm or less, about 100 nm or less, about 80 nm or less, about 70 nm or less, about 60 nm or less, about 50 nm or less, about 40 nm or less, about 30 nm or less). $\Lambda_{20}$ and $\Lambda_{22}$ can be the same as each other or different.

In general, $\Lambda$ is less than $\lambda$, such as about 0.5 $\lambda$ or less (e.g., about 0.3 $\lambda$ or less, about 0.2 $\lambda$ or less, about 0.1 $\lambda$ or less, about 0.08 $\lambda$ or less, about 0.05 $\lambda$ or less, about 0.04 $\lambda$ or less, about 0.03 $\lambda$ or less, about 0.02 $\lambda$ or less, 0.01 $\lambda$ or less). In some embodiments, $\Lambda$ is about 500 nm or less (e.g., about 300 nm or less, about 200 nm or less, about 150 nm or less, about 130 nm or less, about 100 nm or less, about 80 nm or less, about 60 nm or less, about 50 nm or less, about 40 nm or less).

The duty cycle of sub-wavelength grating layer 14, given by the ratio $\Lambda_{22}/\Lambda$, can vary as desired. In some embodiments, the duty cycle is about 50% or less (e.g., about 40% or less, about 30% or less, about 20% or less). Alternatively, in certain embodiments, the duty cycle is more than about 50% (e.g., about 60% or more, about 70% or more, about 80% or more).

The thickness, $h_{14}$, of sub-wavelength grating layer 14 measured along the z-axis can vary as desired. In general, the thickness of sub-wavelength layer 14 is selected based on the desired optical properties of sub-wavelength grating layer 14 at $\lambda$, and the effect of layer thickness on various optical properties is discussed below. In some embodiments, $h_{14}$ can be about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 1,000 or more, such as about 2,000 mm).

The aspect ratio of grating layer thickness, $h_{14}$, to $\Lambda_{20}$ and/or d to $\Lambda_{22}$ can be relatively high. For example $h_{14}:\Lambda_{111}$ and/or $h_{14}:\Lambda_{112}$ can be about 2:1 or more (e.g., about 3:1 or more, about 4:1 or more, about 5:1 or more, about 8:1 or more, about 10:1 or more).

Regarding the specific structure of diffractive layer 16, portions 15 and 18 also extend along the y-direction, forming a periodic structure consisting of a series of alternating rows, where adjacent rows have different optical properties. As discussed above, portions 18 are formed from a material that has a refractive index, $n_{18}$, substantially equal to the refractive index of portions 15 for the pass state radiation at $\lambda$. $|n_{18}-n_P|$ can be, for example, about 0.001 or less (e.g., about 0.0001 or less, about 0.0002 or less, about 0.0001 or less, about 0.00005 or less, about 0.00001 or less).

More generally, in embodiments, $|n_{18}-n_P|$ can be about 0.03 or less (e.g., about 0.2 or less, about 0.1 or less, about 0.05 or less, about 0.01 or less).

The rows corresponding to portions 15 have a width $W_{15}$ in the x-direction, while the rows corresponding to portions 18 have a width $W_{18}$ in the x-direction. The diffractive grating period, W, equal to $W_{15}+W_{18}$, is on the order of or larger than about $\lambda$ and as a result layer 16 diffracts incident block state radiation of wavelength $\lambda$.

In general, $W_{15}$ is about 0.2 $\lambda$ or more (e.g., about 0.5 $\lambda$ or more, about $\lambda$ or more, about 2 $\lambda$ or more, about 5 $\lambda$ or more). In some embodiments, $W_{15}$ is about 200 nm or more (e.g., about 400 nm or more, about 500 nm or more, about 750 nm or more, about 1,000 nm or more, about 1,500 nm or more, about 2,000 nm or more). Similarly, $W_{18}$ can be about 0.2 $\lambda$ or more (e.g., about 0.5 $\lambda$ or more, about $\lambda$ or more, about 2 $\lambda$ or more, about 5 $\lambda$ or more). In some embodiments, $W_{18}$ is about 200 nm or more (e.g., about 400 nm or more, about 500 nm or more, about 750 nm or more, about 1,000 nm or more, about 1,500 nm or more, about 2,000 nm or more). $W_{15}$ and $W_{18}$ can be the same as each other or different.

In general, W is on the order of or larger than about $\lambda$, such as about 1.5 $\lambda$ or more (e.g., about 2 $\lambda$ or more, about 3 $\lambda$ or more, about 4 $\lambda$ or more, about 5 $\lambda$ or more, about 10 $\lambda$ or more, about 20 $\lambda$ or more, about 30 $\lambda$). In embodiments, A is about 400 nm or more (e.g., about 500 nm or more, about 600 nm or more, about 750 nm or more, about 1,000 nm or more, about 1,500 nm or more, about 2,000 nm or more, about 3,000 nm or more, about 4,000 nm or more, about 5,000 nm or more, about 6,000 nm or more, about 8,000 m or more, about 10,000 nm or more, about 15,000 or more).

The duty cycle of diffractive layer, given by the ratio $W_{15}/W$, can vary. In some embodiments, the duty cycle is less than about 50% (e.g., about 40% or less, about 30% or less, about 20% or less). Alternatively, in certain embodiments, the duty cycle is more than about 50% (e.g., about 60% or more, about 70% or more, about 80% or more).

The thickness, $h_{16}$, of diffractive layer 16 measured along the z-axis can vary as desired. Generally, the thickness of diffractive layer 16 is selected based on the desired optical properties of diffractive layer 16 at λ. In some embodiments, $h_{16}$ can be about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 1,000 or more, such as about 2,000 nm).

The aspect ratio of diffractive layer thickness, $h_{16}$, to $W_{15}$ can be relatively high. For example $h_{16}/W_{15}$ can be about 2:1 or more (e.g., about 3:1 or more, about 4:1 or more, about 5:1 or more, about 8:1 or more, about 10:1 or more).

Together, sub-wavelength grating layer 14 and diffractive layer 16 have a combined thickness that is relatively thin. For example, the combined thickness of layers 14 and 16 may be about 5 μm or less (e.g., about 2 μm or less, about 1 μm or less, about 500 nm or less).

The composition of portions 20 and 22 are selected so that polarizer 10 has desired polarizing properties, while the composition of portions 18 are selected so that the portions have a desired refractive index at λ (e.g., so that $n_{18}$ is substantially the same as $n_P$).

The compositions of portions 18, 20, and 22 are also selected based compatibility with the processes used to manufacture polarizer 10 and their compatibility with the materials used to form other portions of polarizer 10.

Portions 18, 20, and/or 22 can include inorganic and/or organic materials. Examples of inorganic materials include metals, semiconductors, and inorganic dielectric materials (e.g., glass). Examples of organic materials include organic polymers. As discussed previously, in some embodiments, portions 18 and 20 are formed from materials that are substantially transmissive at λ and can include one or more dielectric materials, such as dielectric oxides (e.g., metal oxides), fluorides (e.g., metal fluorides), sulphides, and/or nitrides (e.g., metal nitrides). Examples of oxides include $SiO_2$, $Al_2O_3$, $Nb_2O_5$, $TiO_2$, $ZrO_2$, $HfO_2$, $SnO_2$, ZnO, $ErO_2$, $Sc_2O_3$, and $Ta_2O_5$. Examples of fluorides include $MgF_2$. Other examples include ZnS, $SiN_x$, $SiO_yN_x$, AlN, TiN, and HfN.

Portions 22 are formed from a material that is substantially non-transmissive at λ. In certain embodiments, portions 22 include a metal, such as Au, Ag, Al, Cr, and Cu. Portions 22 can be formed from more than one metal (e.g., portions 22 can be formed from a metal alloy).

A one millimeter thick sample of a substantially transmissive material transmits about 80% or more (e.g., about 90% or more, about 95% or more, about 98% or more, about 99% or more) of radiation at λ normally incident thereon. Examples of substantially transmissive materials for visible and infrared wavelengths include various dielectric materials, such as $SiO_2$.

A one millimeter thick sample of a substantially non-transmissive material transmits about 1% or less (e.g., about 0.5% or less, about 0.1% or less, about 0.01% or less, about 0.001% or less) of radiation at λ normally incident thereon. Substantially non-transmissive materials include materials that reflect and/or absorb a relatively large amount of radiation at λ. Examples of non-transmissive materials for visible and infrared wavelengths include various metals, such as Al, Au, Ag, Cr, and Cu. Al and Ag are examples of materials that have high reflectance across the visible portion of the electromagnetic spectrum, while Au and Cu have high reflectance for the yellow and red portions of the spectrum, while absorbing relatively more of the shorter visible wavelengths (e.g., the green and blue wavelengths).

In some embodiments, the compositions of portions 18, 20 and/or 22 have a relatively low absorption at λ, so that sub-wavelength grating layer 14 has a relatively low absorption at λ. For example, sub-wavelength grating layer 14 can absorb about 10% or less (e.g., about 5% or less, about 3% or less, about 2% or less, about 1% or less) of radiation at λ incident on reflective polarizer 10 propagating along axis 101.

Portions 18, 20 and/or 22 can be formed from a single material or from multiple different materials. In some embodiments, one or more of portions 18, 20, and 22 are formed from a nanolaminate material, which refers to materials that are composed of layers of at least two different materials and the layers of at least one of the materials are extremely thin (e.g., between one and about 10 monolayers thick). Optically, nanolaminate materials have a locally homogeneous index of refraction that depends on the refractive index of its constituent materials. Varying the amount of each constituent material can vary the refractive index of a nanolaminate. Examples of nanolaminate portions include portions composed of $SiO_2$ monolayers and $TiO_2$ monolayers, $SiO_2$ monolayers and $Ta_2O_5$ monolayers, or $Al_2O_3$ monolayers and $TiO_2$ mono layers Generally, portions 18, 20 and/or 22 can include crystalline, semi-crystalline, and/or amorphous materials. Typically, an amorphous material is optically isotropic and may transmit radiation better than materials that are partially or mostly crystalline. As an example, in some embodiments, both portions 18 and/or 20 are formed from amorphous materials, such as amorphous dielectric materials (e.g., amorphous $TiO_2$ or $SiO_2$), while portions 22 are formed from a crystalline or semi-crystalline material (e.g., crystalline or semi-crystalline Si).

In general, the structure and composition of sub-wavelength grating layer 14 and diffractive layer 16 are selected based on the desired optical performance of reflective polarizer 10. Structural parameters that affect the optical performance of linear polarizer 10 include, for example, $h_{14}$, $h_{16}$, Λ, $Λ_{111}$, and $Λ_{112}$, W, $W_{15}$, $W_{18}$. Typically, varying a single parameter affects multiple different performance parameters. For example, the overall transmission of the polarizer at λ can be varied by changing the relative thickness of portions formed from a transmissive material, e.g., $Λ_{20}$, to the thickness or portions formed from a non-transmissive material, e.g., $Λ_{22}$. However, while a higher ratio $Λ_{20}/Λ_{22}$ may provide relatively higher transmission of the pass state polarization, it also results in higher transmission of the block state polarization, which decreases $E_T$. As a result, optimizing the polarizer's performance involves trade offs between different performance parameters and the polarizer's structure and composition is varied depending on the desired performance for the polarizer's end use application.

In general, to effectively polarize radiation at wavelength λ, the period Λ of the sub-wavelength grating layer should be shorter than λ, such as about λ/4 or less (e.g., about λ/6 or less, about λ/10 or less). Moreover, for effective broadband performance, Λ should be shorter than the shortest wavelength in the wavelength band. For a broadband polarizer in the visible spectrum, for example, Λ should be less than about 300 nm, such as about 200 nm or less (e.g., about 150 nm or less, about 130 nm or less, about 110 nm or less, about 100 nm or less, about 90 nm or less, about 80 nm or less). Furthermore, to effectively reduce specular reflection of the block state, the period W of the diffractive layer should be in a range from about λ to about 20λ (e.g., from about λ to about 10λ).

Typically, the reflectance of sub-wavelength grating layer 14 for block state radiation can be increased by forming at least some of the portions from a material having a relatively high reflectance at λ. The reflectance of the polarize can also be increased by increasing the relative size of the portions of reflective material relative to the portions of transmissive material. In other words, a larger duty cycle can provide increased reflectance at $\lambda$. However, this can also reduce pass state transmission. Conversely, the transmission of sub-wavelength grating layer 14 can be increased by reducing the duty cycle. Typically, the duty cycle is in the range of about 20% to about 80%.

In some embodiments, $E_T$ can be increased by increasing the depth of sub-wavelength grating layer 14, $h_{14}$. Increasing $h_{14}$ can provide increased $E_T$ without substantially reducing the amount of pass state transmission.

Furthermore, the extent to which block state radiation is specularly or diffusely reflected can be varied by modifying the thickness and/or duty cycle of diffractive layer 16.

Theoretical models can be used to assess the performance of the sub-wavelength and/or diffractive layers and to determine structure and composition that will provide desired optical performance. For example, the performance of sub-wavelength grating polarizers can be modeled using coupled-wave analysis as described by J. J. Kuta et al. in the article entitled "Coupled-wave analysis of lamellar metal transmission gratings for the visible and the infrared," *J. Opt. Soc. Am. A*, Vol. 12, No. 5, pp. 1118-1127 (1995). Theory relating to the performance of diffractive gratings is discussed, for example, in Diffraction Gratings and Applications, by E. G Loewen and Evgeny Popov, Marcel Dekker, Inc., New York (1997).

Referring now to substrate 12, in general, the substrate provides mechanical support to polarizer 10. Substrate 12 can be formed from any material compatible with the manufacturing processes used to produce retarder 12 that can support the other layers. In certain embodiments, substrate 12 is transparent at wavelength $\lambda$, transmitting substantially all radiation impinging thereon at wavelength $\lambda$ (e.g., transmitting about 90% or more, about 95% or more, about 97% or more, about 99% or more, about 99.5% or more). In certain embodiments, substrate 12 is formed from a glass, such as BK7 (available from Abrisa Corporation), borosilicate glass (e.g., pyrex available from Corning), aluminosilicate glass (e.g., C1737 available from Corning), or quartz/fused silica. In some embodiments, substrate 12 can be formed from a crystalline material, such as a non-linear optical crystal (e.g., $LiNbO_3$ or a magneto-optical rotator, such as garnett) or a crystalline (or semicrystalline) semiconductor (e.g., Si, InP, or GaAs). Substrate 12 can also be formed from an organic material, such as a polymer (e.g., a plastic).

Figure 2A:
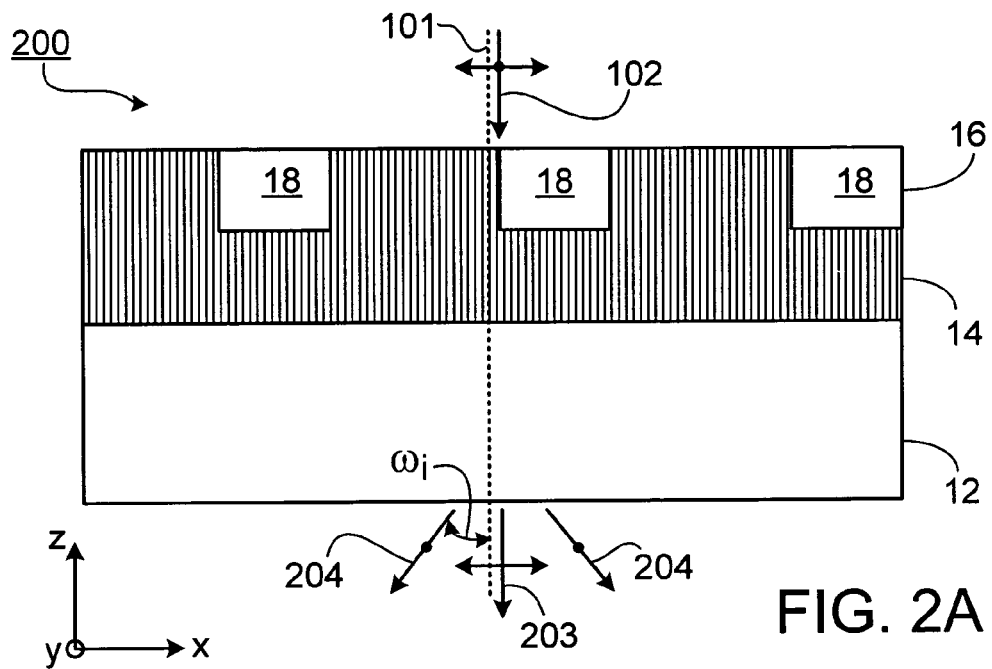
FIG. 2A is a cross-sectional view of an embodiment of a transmissive polarizer that includes a sub-wavelength grating layer and a diffractive layer.

While reflective polarizer 10 substantially blocks one polarization state of incident light, certain articles that include sub-wavelength and diffractive structure substantially transmit both polarization states. Referring to FIG. 2A, an example of such an article is transmissive polarizer 200. Structurally, transmissive polarizer 200 is the same as reflective polarizer 10. However, in this case, portions 22 are formed from a material that is substantially transmissive at $\lambda$. Thus, polarizer 210 substantially transmits all radiation 102 at $\lambda$ incident thereon, but transmits orthogonal polarization states along different paths.

The substantially transmissive material forming portions 22 has a different refractive index at $\lambda$ from the material forming portions 20. For example, $|n_{20}-n_{22}|$ can be about 0.01 or more (e.g., about 0.02 or more, about 0.05 or more, about 0.1 or more, about 0.15 or more, about 0.2 or more, about 0.25 or more, about 0.3 or more), wherein $n_{20}$ and $n_{22}$ are the refractive indices of the materials forming portions 20 and 22, respectively.

As a result of the sub-wavelength structure, layer 14 is form-birefringent for radiation at $\lambda$ with the radiation polarized in the x-z plane having a different refractive index from radiation polarized perpendicular to the x-z plane. As for reflective polarizer 10, portions 18 are formed from a material having a refractive index approximately equal to the refractive index of portions 15 for radiation polarized perpendicular to the x-z plane. Thus, the diffractive structure of layer 16 diffracts radiation polarized perpendicular to the x-z plane into non-zero order diffracted states (depicted as 204 in FIG. 2 and referred to as "diffracted state" polarization), while it transmits radiation polarized in the x-z plane in the zero-order diffracted state (depicted as 203 in FIG. 2 and referred to as "pass state" polarization).

In general, the diffracted state radiation can be diffracted into one or more non-zero order diffracted states (e.g., into the ±1, ±2, ±3 . . . diffracted states). The angular dispersion of the non-zero order diffracted states, corresponding to an angle $\omega_i$ for each state (where i corresponds to the diffraction order and=±1, ±2, ±3 . . . ), can vary depending on the structure and composition of the diffractive layer. In some embodiments, diffracted state radiation can be dispersed into relatively high angles. For example, $\omega_i$ can be about 20° or more (e.g., about 30° or more, about 45° or more). Alternatively, in certain embodiments, $\omega_i$ can be relatively small (e.g., about 10° or less, about 5° or less, such as about 3°).

In some embodiments, transmissive polarizer 200 directs a relatively large amount of the incident diffracted state polarization in a single direction (e.g., into the +1 or −1 diffracted order). For example, transmissive polarizer 200 can direct about 50% or more (e.g., about 60% or more, about 70% or more, about 80% or more, about 90% or more, about 95% or more, about 98% or more, about 99% or more) of the diffracted state polarization in a single direction. In some embodiments, the structure of transmissive polarizer 200 is arranged so that the polarizer is at blazing conditions at the wavelength $\lambda$. Blazing is discussed, for example, by D. A. Buralli and G. M. Morris in the article, "Effects of diffraction efficiency on the modulation transfer function of diffractive lenses," *Appl. Opt.* 31, 4389-4396, (1992).

While $n_P$ is substantially the same as $n_{18}$ in the reflective polarizer and transmissive polarizer described above, in certain embodiments $n_P$ and $n_{18}$ need not be the same. For example, in some embodiments diffraction of pass state radiation may be desired, in which case portions 18 can be formed from a material that has a different refractive index than $n_P$. In some embodiments of reflective polarizers, specular reflection of block state radiation in addition to diffraction of pass state radiation may be desired. Accordingly, portions 18 can be formed from a material that has a refractive index substantially equal to $n_B$ at $\lambda$.

Furthermore, while the material used to form portions 18 is optically isotropic for reflective polarizer 10 described above, anisotropic materials can also be used. For example, in some embodiments, portions 18 can be formed from materials that are birefringent at $\lambda$. Examples include using form birefringent materials (e.g., materials with sub-wavelength structure), liquid crystalline materials, and/or anisotropic crystalline materials).

In polarizers 10 and 200, elongated rows 20 and 22 have a rectangular profile. More generally, these rows can have profiles with different shapes. For example, in some embodiments, elongated rows 20 and 22 can have a trapezoidal, triangular (also referred to as "saw-tooth"), or curved (e.g., oval, convex hull or sinusoidal) profile.

Figure 2B:
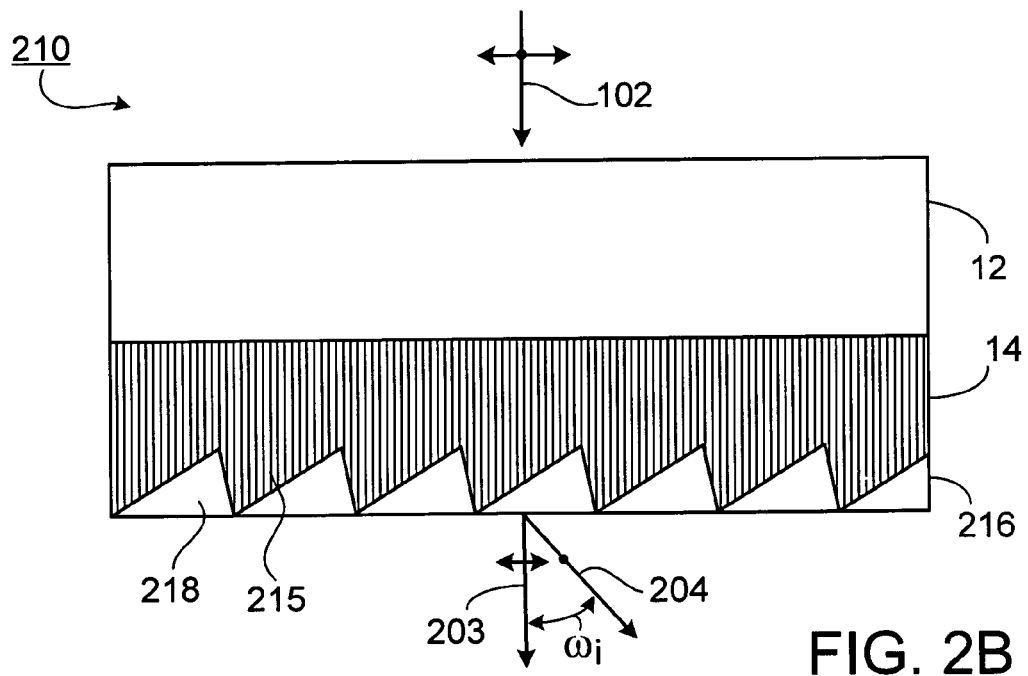
FIG. 2B is a cross-sectional view of another embodiment of a transmissive polarizer that includes a sub-wavelength grating layer and a diffractive layer.

Similarly, the diffractive layer can also have a non-rectangular profile. For example, in some embodiments, diffractive layer 16 can have a trapezoidal, triangular, or curved (e.g., oval, convex hull or sinusoidal) profile. An example of a transmission-only polarizer having a diffractive layer with a triangular profile is shown in FIG. 2B. Polarizer 210 includes a diffractive layer 216 that includes isotropic portions 218 and form-birefringent portions 215, that both extend along the y-direction. Portions 218 and 215 form a grating with a triangular profile, with portions 18 corresponding to a series of filled, V-shaped, trenches.

Figure 3:
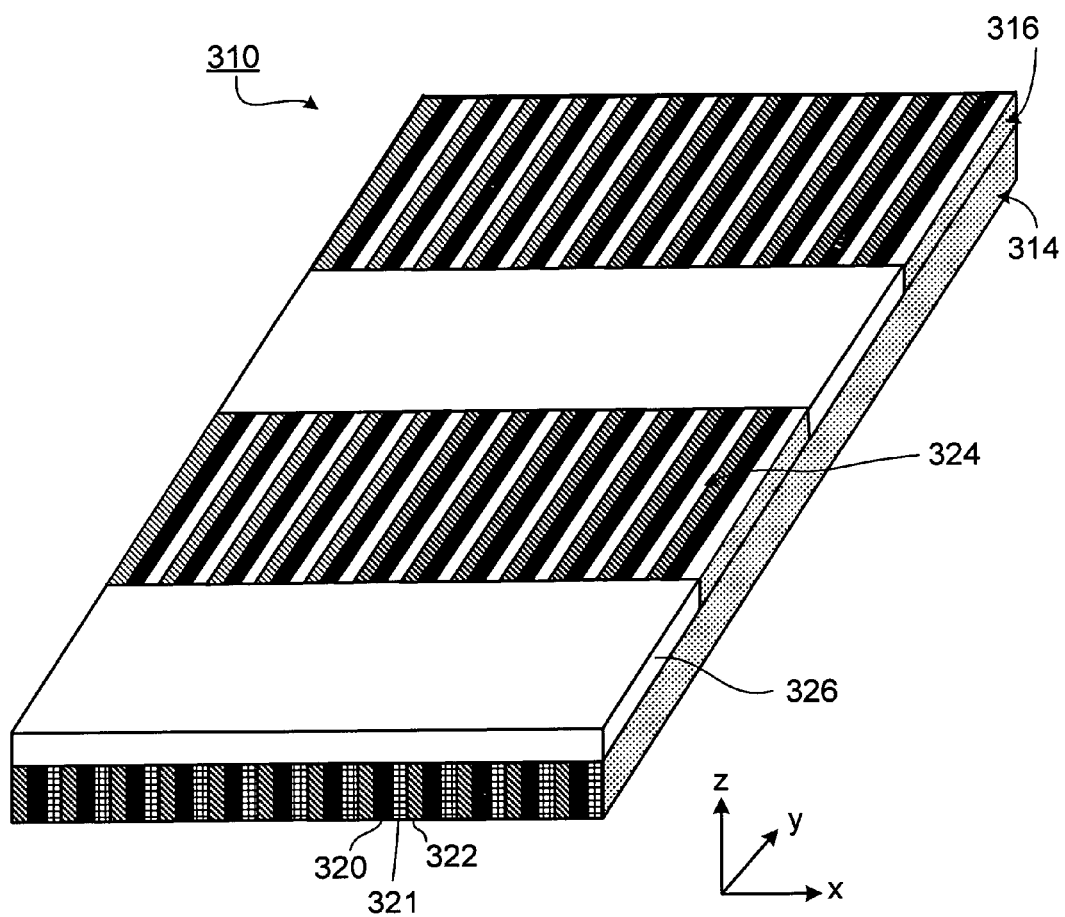
FIG. 3 is a perspective view of an embodiment of a polarizer that includes a sub-wavelength grating layer and a diffractive layer.

In the polarizers described above, the rows forming the diffractive and sub-wavelength structure extend parallel to each other. In general, however, the relative orientation of the sub-wavelength and diffractive structures can vary as desired. In some embodiments, for example, the rows forming the diffractive and sub-wavelength structure can extend along orthogonal directions. For example, referring to FIG. 3, a polarizer 310 can include a sub-wavelength grating 314 and a layer 316 having a diffractive structure that includes portions 324 and 326 extending along one direction (the x-direction), where portions 324 include a sub-wavelength structure consisting of rows extending along a different direction (the y-direction).

Furthermore, sub-wavelength grating layers can include more than two alternating portions. For example, layer 314 includes a periodic structure that includes three repeating portions 320, 321, and 322. In general, sub-wavelength grating layers can include periodic structures that have more than three portions (e.g., four repeating portions, five repeating portions, six repeating portions). For example, one or more portions may be included for enhancing adhesion between the other portions. For example, Cr portions may be used to enhance adhesion of a structure that includes Au portions and $SiO_2$ portions. As another example, one or more portions may be used to adjust the dispersion properties of the grating. For example, portions of dielectric materials with different dispersion properties can be used to modify the dispersion properties of the grating.

Figure 4:
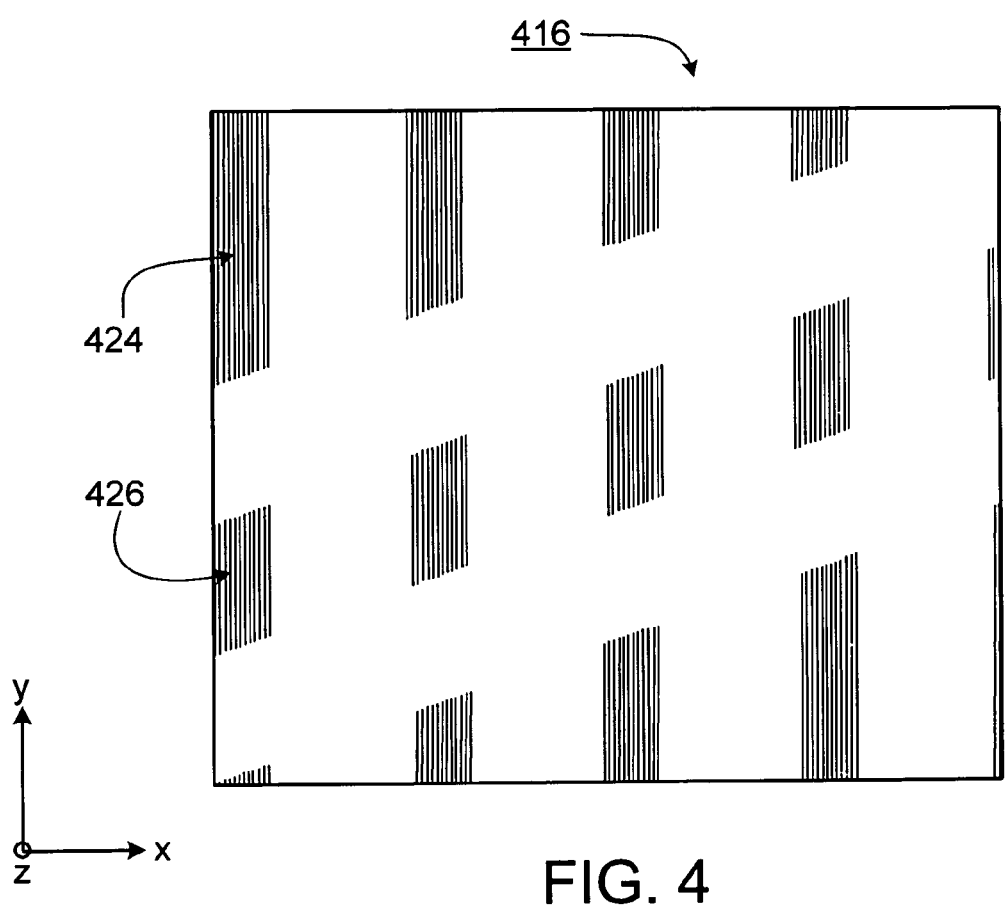
FIG. 4 is a plan view of another embodiment of a diffractive layer.
Figure 5:
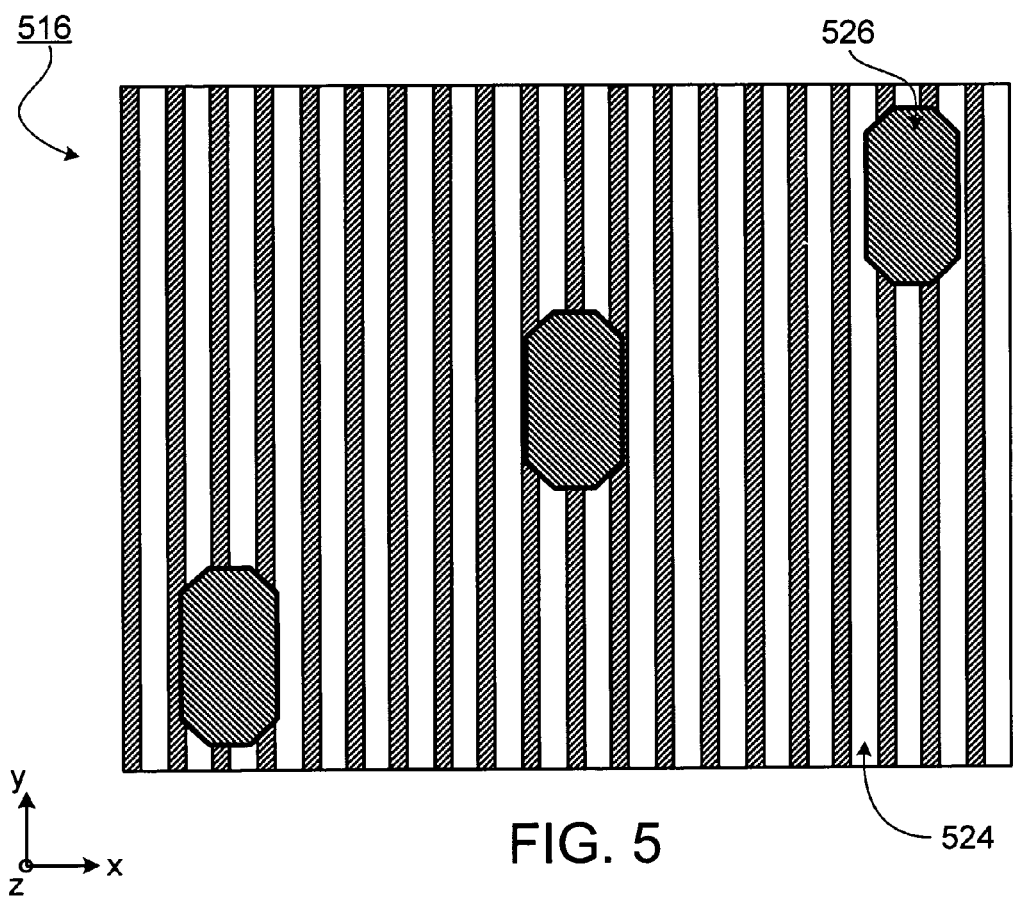
FIG. 5 is a plan view of another embodiment of a diffractive layer.

In some embodiments, the diffractive layer may be periodic in two dimensions. For example, FIG. 4 shows an embodiment of a diffractive layer 416 that includes portions 424 surrounded by portions 426. Portions 424 include rows of different materials forming sub-wavelength structured regions, while portions 426 are isotropic. Layer 416 is periodic in two non-orthogonal directions (e.g., the y-direction and a direction non-parallel to the x- and y-directions). Alternatively, diffractive structured layer 416 may be periodic in two orthogonal directions, such as along the x- and y-directions. FIG. 5 shows another example of a layer 516 having a diffractive structure that is periodic along two directions. Layer 516 includes portions 526 that have closed boundaries surrounded by portions 524 which are sub-wavelength structured regions.

Figure 6:
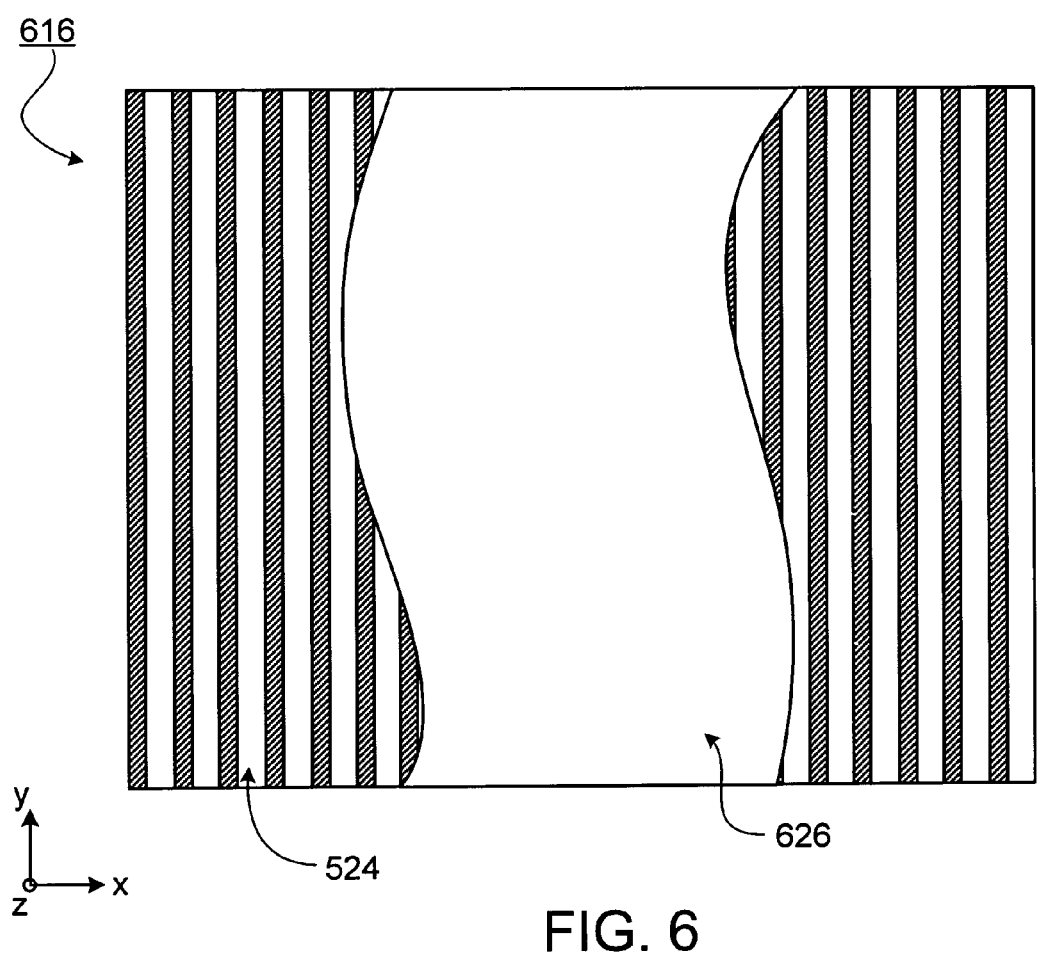
FIG. 6 is a plan view of yet another embodiment of a diffractive layer.

In some embodiments, the boundaries between different portions in the diffractive structured layer may be curved. For example, referring to FIG. 6, a diffractive structured layer 616 includes portions 624 that include sub-wavelength structured regions periodic in the x-direction, and portions 626. The boundaries between portions 624 and 626 extend generally along the y-direction, but follow curved paths. The shapes of the boundaries can repeat, such that diffractive structured layer 616 is periodic in both the x- and y-directions.

While sub-wavelength grating layer 14 in polarizers 10 and 200 is periodic in the x-direction with period Λ, more generally, other structures can also be used. For example, the period of the sub-wavelength grating layer may vary in different portions of the layer (e.g., the grating can be a chirped grating). Alternatively, the spacing between adjacent portions in layer 14 can vary randomly.

Similarly, diffractive layer 16 can have a varying period (e.g., a chirped grating structure). In some embodiments, portions 18 can be randomly distributed through the layer. For example, portions 18 can be distributed so that layer 16 substantially scatters, rather than diffracts, incident block/diffracted state radiation.

Figure 7:
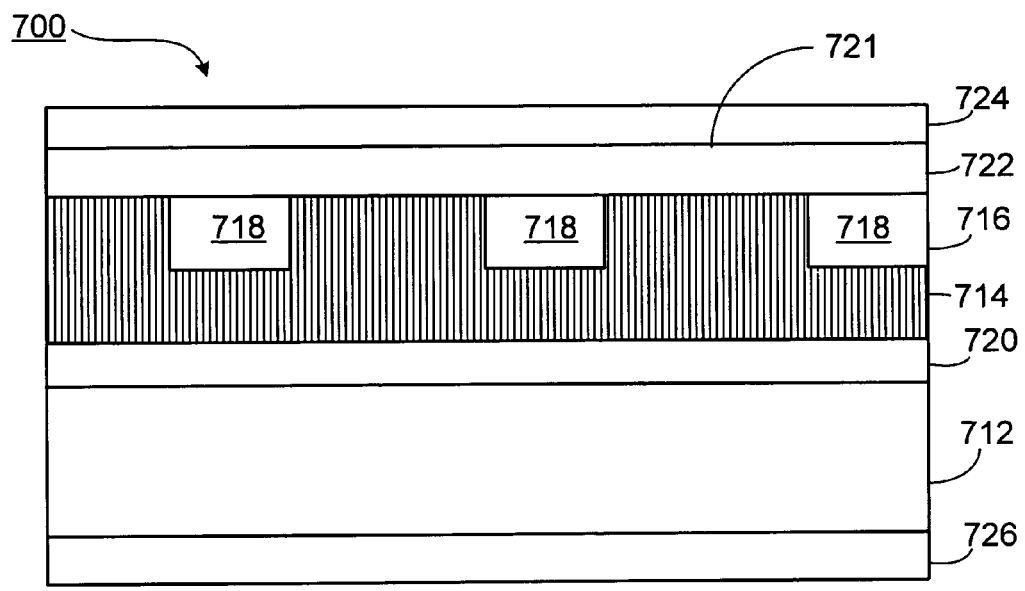
FIG. 7 is a cross-sectional view of an embodiment of a polarizer that includes a sub-wavelength grating layer and a diffractive layer.

While the polarizers described above include a sub-wavelength grating layer in addition to a layer that has both sub-wavelength and diffractive structures, in some embodiments, polarizers can be formed without the sub-wavelength layer (e.g., without layer 14 in polarizers 10 and 200). Moreover, in general, embodiments of polarizers can include one or more layers in addition to the sub-wavelength and diffractive layers. For example, referring to FIG. 7, a polarizer 700 includes an etch stop layer 720, a cap layer 722, and antireflection films 724 and 726 in addition to a substrate 712, a sub-wavelength grating layer 714 and diffractive layer 716. Diffractive layer 716 includes portions 718.

Etch stop layer 720 is formed from a material resistant to etching processes used to etch a material(s) from which the sub-wavelength layer is formed (see discussion below). The material(s) forming etch stop layer 720 should also be compatible with substrate 712 and with the materials forming sub-wavelength grating layer 714. Examples of materials that can form etch stop layer 720 include $HfO_2$, $SiO_2$, $Ta_2O_5$, $TiO_2$, $SiN_x$, or metals (e.g., Cr, Ti, Ni).

The thickness of etch stop layer 720 can be varied as desired. Typically, etch stop layer 720 is sufficiently thick to prevent significant etching of substrate 712, but should not be so thick as to adversely impact the optical performance of polarizer 700 significantly. In some embodiments, etch stop layer is about 500 nm or less (e.g., about 250 nm or less, about 100 nm or less, about 75 nm or less, about 50 nm or less, about 40 nm or less, about 30 nm or less, about 20 nm or less).

Cap layer 722 is typically formed from the same material (s) as portions 718 and provides a surface 721 onto which additional layers, such as the layers forming antireflection film 724, can be deposited. Surface 721 can be substantially planar.

Antireflection films 724 and 726 can reduce the reflectance of pass state radiation of wavelength λ impinging on and exiting polarizer 700. Antireflection film 724 and 726 generally include one or more layers of different refractive index. As an example, one or both of antireflection films 724 and 726 can be formed from four alternating high and low index layers. The high index layers can be formed from $TiO_2$ or $Ta_2O_5$ and the low index layers can be formed from $SiO_2$ or $MgF_2$. The antireflection films can be broadband antireflection films or narrowband antireflection films.

In some embodiments, polarizer 700 has a reflectance of about 20% or less (e.g., about 10% or less, about 5% or less, about 2% or less, about 1% or less, about 0.5% or less, about 0.2% or less, about 0.1% or less, about 0.02% or less) of radiation impinging thereon at wavelength λ for pass state polarization.

Figure 8:
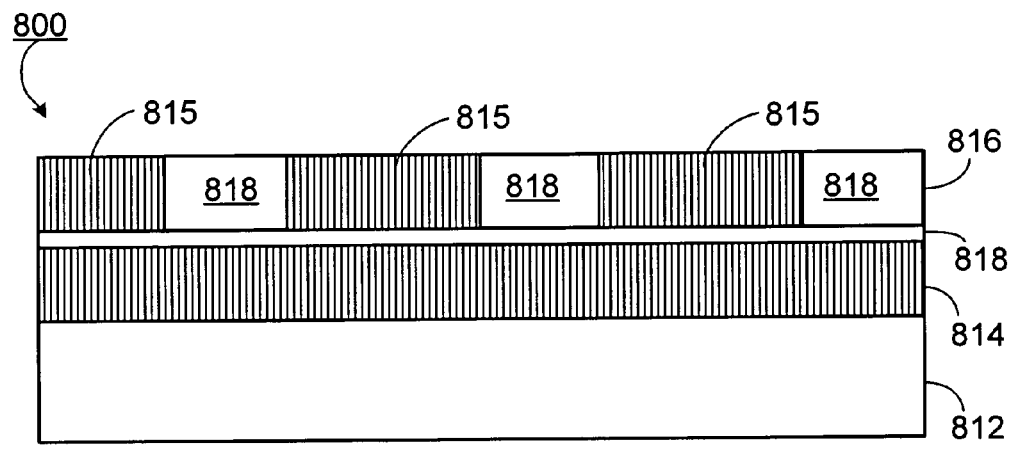
FIG. 8 is a cross-sectional view of an embodiment of a polarizer that includes a sub-wavelength grating layer, a diffractive layer, and another layer disposed between the sub-wavelength grating layer and diffractive layer.

Referring to FIG. 8, in some embodiments, a layer can be disposed between the sub-wavelength grating layer and the diffractive layer. A polarizer 800 includes a substrate 812, a sub-wavelength grating layer 814, and a diffractive layer 816. Diffractive layer 816 includes portions 18 formed from an homogenous material and portions 815 that have a sub-wavelength structure. Another layer 818 is disposed between sub-wavelength grating layer and diffractive layer 816.

While the rows forming the sub-wavelength structure in the sub-wavelength layer in polarizers 10 and 200 are continuous with the sub-wavelength structure in the diffractive layer, other structures are also possible. In some embodiments, such as in polarizer 800, the sub-wavelength structure in sub-wavelength layer is discontinuous with the sub-wavelength structure in the diffractive layer. Moreover, the sub-wavelength structure in the diffractive layer can have a different orientation, period, duty cycle, and/or composition than the sub-wavelength structure in the sub-wavelength grating layer.

Figure 9A:
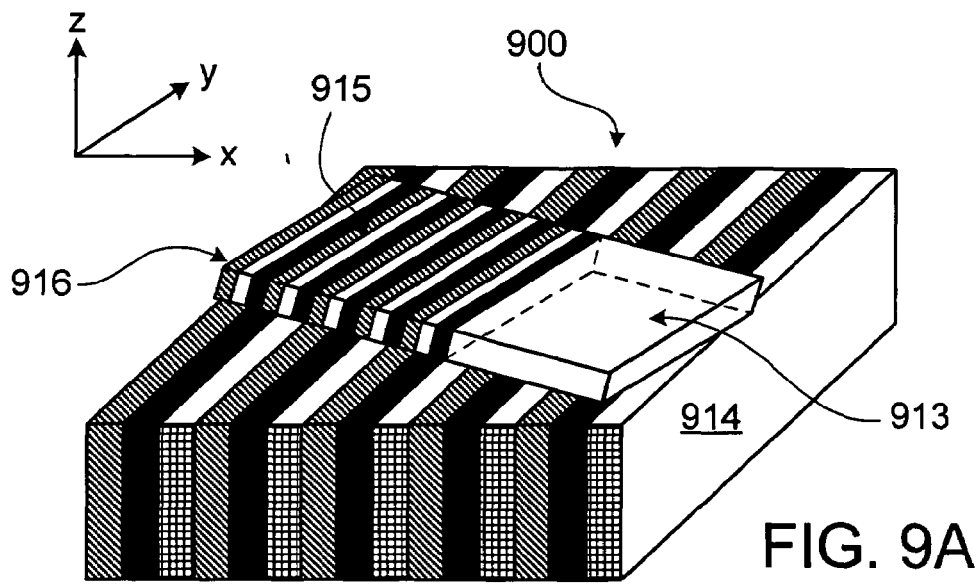
FIG. 9A is a perspective view of an embodiment of a polarizer that includes a sub-wavelength grating layer and a diffractive layer.
Figure 9B:
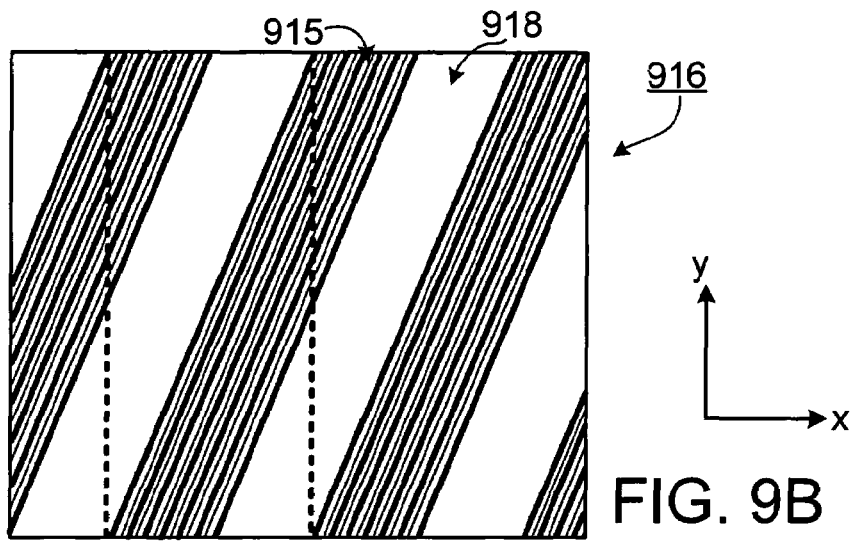
FIGS. 9B and 9C are plan views of the diffractive and sub-wavelength grating layers, respectively, of the polarizer shown in FIG. 9A.
Figure 9C:
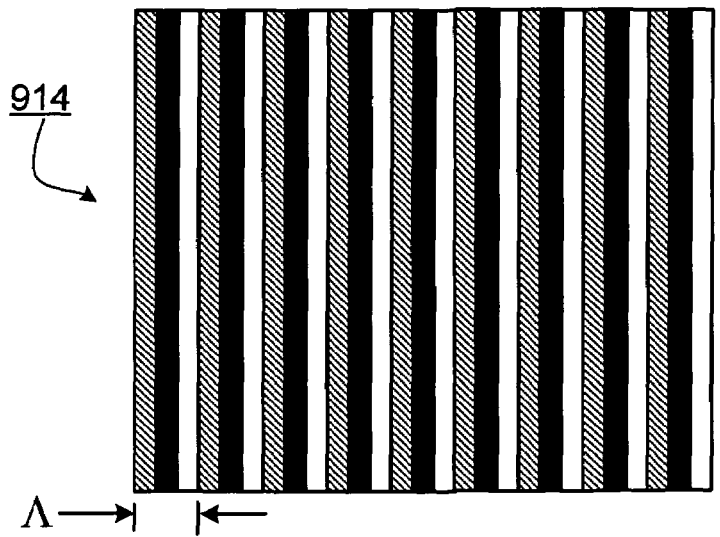

For example, referring to FIGS. 9A-9C, a polarizer 900 has a sub-wavelength grating layer 914 and a diffractive layer 916. Layer 914 is periodic in the x-direction, while layer 916 includes portions 915 that have a sub-wavelength structure that is periodic along another direction in the x-y plane. Layer 916 also includes portions 918 that are formed from a homogeneous material. Referring to FIG. 9B, in diffractive layer 916 portions 918 and 915, and the alternating rows of material forming the sub-wavelength structure of portions 915 extend along a direction $\theta_g$ with respect to the x-axis. FIG. 9C shows the structure of sub-wavelength layer 914 which includes rows extending parallel to the y-axis.

In some embodiments, polarizers can include more than one diffractive layer. For example, referring to FIG. 10, a polarizer 1000 has a sub-wavelength grating layer 1014 and diffractive layers 1016 and 1026. Diffractive layer 1016 includes alternating portions 1015 and 1018. Similarly, diffractive layer 1026 includes alternating portions 1025 and 1028. Portions 1018 and 1028 are formed from a material having a sub-wavelength structure. A cap layer 1020 separates layer 1026 from layer 1014.

Figure 10:
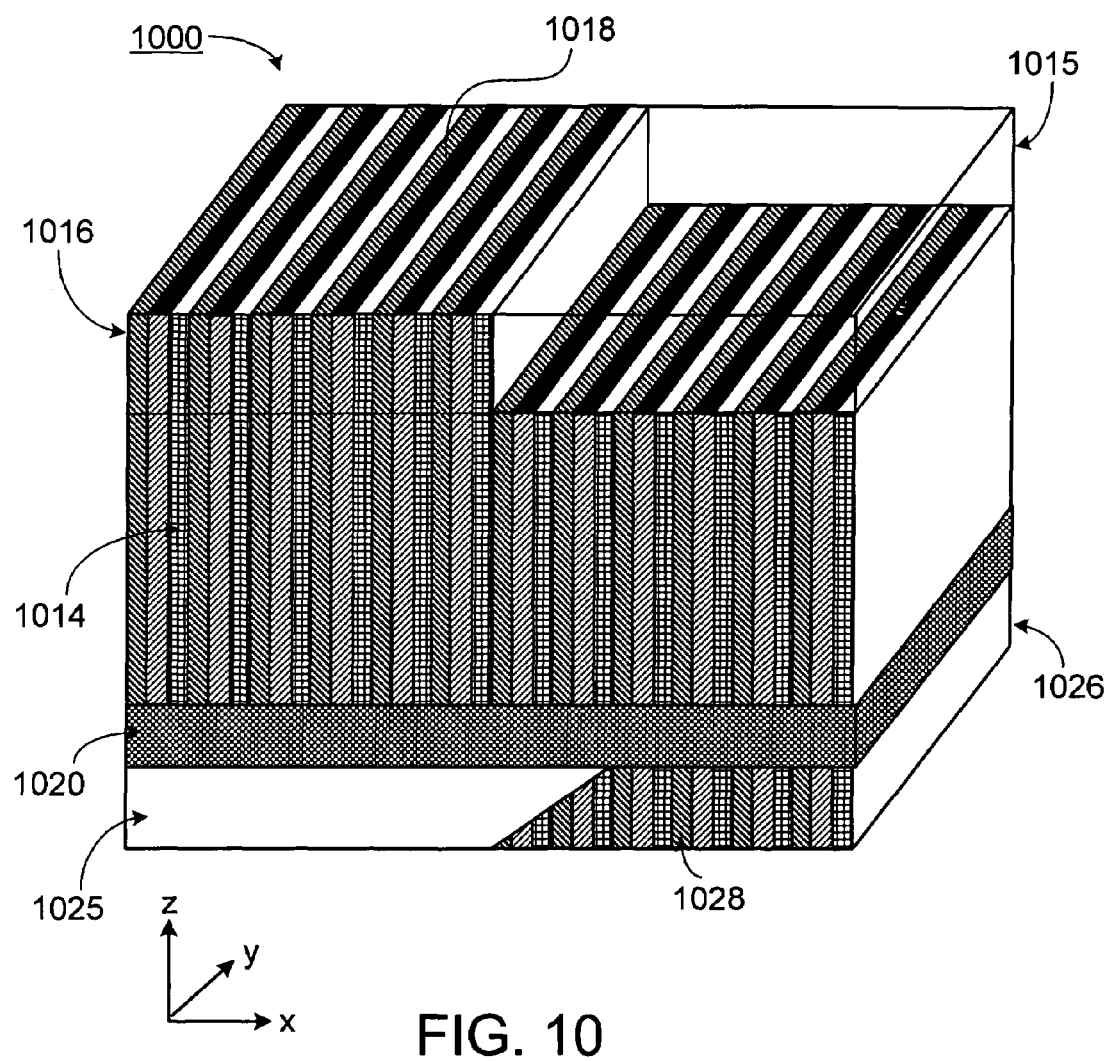
FIG. 10 is a schematic diagram of an embodiment of a polarizer that includes two diffractive structures offset from one another.

The relative spatial arrangement of the portions forming diffractive layers 1016 and 1026 may vary as desired. For example, as shown in FIG. 10, layers 1016 and 1026 are periodic in the x-direction with the same period, but are spatially offset from one another in the x-direction by one-half period. More generally, layers 1026 and 1026, having the same period, may be offset from one another by a desired amount in order to control performance properties of polarizer 1000, such as the amount of radiation having the pass state polarization that is transmitted by polarizer 1000.

Turning now to the fabrication of polarizers, in general, a variety of techniques can be used to form such structures. In some embodiments, a sub-wavelength grating layer can be prepared initially, and subsequently a diffractive grating structure can be formed in the sub-wavelength grating layer by etching trenches into the surface of the sub-wavelength grating layer. Material can be deposited onto the diffractive grating structure to fill in the trenches corresponding to portions 18. FIGS. 11A-I show different phases of an example of a preparation process for a sub-wavelength structured layer. The procedures may be repeated, albeit using a mask corresponding to a diffractive grating structure, to form the diffractive grating structure in the sub-wavelength grating layer.

Figure 11A:
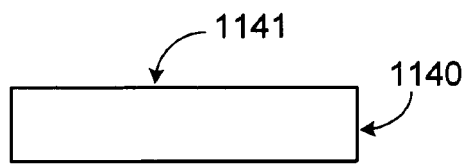
FIGS. 11A-I show steps in the manufacture of a sub-wavelength structured layer.

Referring to FIG. 11A, initially, substrate 1140 is provided. Surface 1141 of substrate 1140 can be polished and/or cleaned (e.g., by exposing the substrate to one or more solvents, acids, and/or baking the substrate).

Figure 11B:
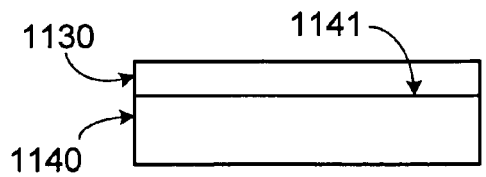

Referring to FIG. 11B, etch stop layer 1130 is deposited on surface 1141 of substrate 1140. The material forming etch stop layer 1130 can be formed using one of a variety of techniques, including sputtering (e.g., radio frequency sputtering), evaporating (e.g., electron beam evaporation, ion assisted deposition (IAD), electron beam evaporation), or chemical vapor deposition (CVD) such as plasma enhanced CVD (PECVD), atomic layer deposition (ALD), or by oxidization. As an example, a layer of $HfO_2$ can be deposited on substrate 1140 by IAD electron beam evaporation.

Figure 11C:
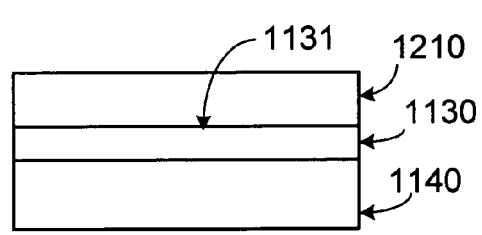

Referring to FIG. 11C, an intermediate layer 1210 is then deposited on surface 1131 of etch stop layer 1130. Portions 1112 are etched from intermediate layer 1210, so intermediate layer 1210 is formed from the material used for portions 1112. The material forming intermediate layer 1210 can be deposited using one of a variety of techniques, including sputtering (e.g., radio frequency sputtering), evaporating (e.g., election beam evaporation), or chemical vapor deposition (CVD) (e.g., plasma enhanced CVD).

In certain embodiments intermediate layer 1210 is formed from a metal, such as aluminum. Metal layers can be formed by evaporation (e.g., thermal evaporation), for example. In embodiments, metal layers are formed by evaporating the metal onto surface 1131 at relatively fast rates, such as about 5 Angstroms per second or more (e.g., about 10 Angstroms per second or more, about 12 Angstroms per second or more, about 15 Angstroms per second or more), for example. Fast deposition rates can improve the purity of the metal layer by reducing the amount of impurities (such as oxygen) that can incorporate into the film as it is deposited.

In some embodiments, the substrate can be cooled prior to and/or during metal deposition. For example, the substrate can be cooled to about 0° C. or less (e.g., about −20° C. or less, about −50° C. or less). Cooling the substrate can increase the size of metal grains formed on the substrate during deposition. Without wishing to be bound by theory, it is believed that lower substrate temperature can reduce the kinetic energy of the metal clusters that tend to prevent the clusters from forming larger grains. Larger metal grain size may be beneficial by providing improved optical characteristics, such as higher reflectance compared to metal layers composed of smaller grains. Moreover, grating layers having short periods can be more easily formed from metal layers having larger grain sizes.

Evaporation can also be performed under relatively high vacuums, such as vacuums of about $10^{-6}$ Torr or less (e.g., about $5 \times 10^{-7}$ Torr or less, about $2 \times 10^{-7}$ Torr or less). High vacuum deposition can also improve the purity of the metal layer by reducing the amount of impurities (such as oxygen) present in the vicinity of the deposited layer as it is formed, thereby reducing the amount of impurities that are incorporated in the film.

In some embodiments, substrate 1140 is positioned relatively far from the source of the deposited metal in the deposition chamber (e.g., about 12 inches or more, about 15 inches or more, about 20 inches or more, about 24 inches or more). This can increase the uniformity of the deposited material across surface 1131 relative to systems in which the source is positioned closer to the substrate.

In general, the thickness of intermediate layer 1210 is selected based on the desired thickness of sub-wavelength structured layer 1110.

Intermediate layer 1210 is processed to provide portions 1112 of grating layer 1110 using lithographic techniques. For example, portions 1112 can be formed from intermediate layer 1210 using electron beam lithography or photolithography (e.g., using a photomask or using holographic techniques).

Figure 11D:
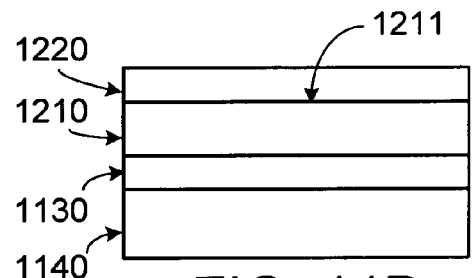
Figure 11E:
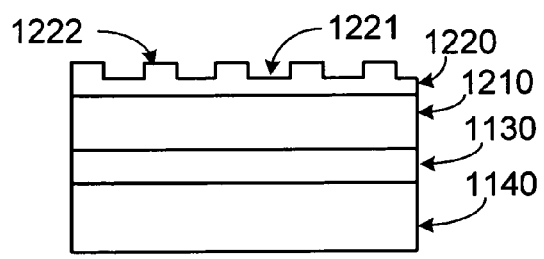
Figure 11F:
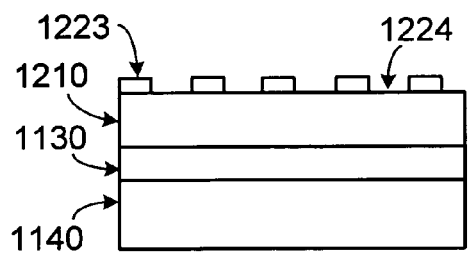

In some embodiments, portions 1112 are formed using nano-imprint lithography. Referring to FIG. 11D, nano-imprint lithography includes forming a layer 1220 of a resist on surface 1211 of intermediate layer 1210. The resist can be polymethylmethacrylate (PMMA) or polystyrene (PS), for example. Referring to FIG. 11E, a pattern is impressed into resist layer 1220 using a mold. The patterned resist layer 1220 includes thin portions 1221 and thick portions 1222. Patterned resist layer 1220 is then etched (e.g., by oxygen reactive ion etching (RIE)), removing thin portions 1221 to expose portions 1224 of surface 1211 of intermediate layer 1210, as shown in FIG. 11F. Thick portions 1222 are also etched, but are not completely removed. Accordingly, portions 1223 of resist remain on surface 1211 after etching.

Figure 11G:
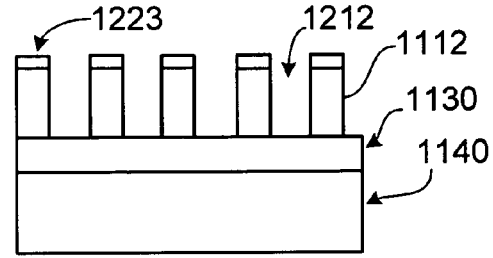
Figure 11H:
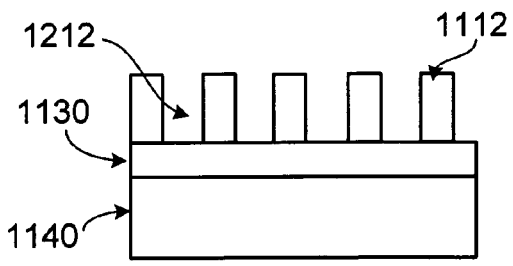

Referring to FIG. 11G, the exposed portions of intermediate layer 1210 are subsequently etched, forming trenches 1212 in intermediate layer 1210. The unetched portions of intermediate layer 1210 correspond to portions 1112 of sub-wavelength structure 1110. Intermediate layer 1210 can be etched using, for example, reactive ion etching, ion beam etching, sputtering etching, chemical assisted ion beam etching (CAIBE), or wet etching. The exposed portions of intermediate layer 1210 are etched down to etch stop layer 1130, which is formed from a material resistant to the etching method. Accordingly, the depth of trenches 1212 formed by etching is the same as the thickness of portions 1112. After etching trenches 1212, residual resist 1223 is removed from portions 1112. Resist can be removed by rinsing the article in a solvent (e.g., an organic solvent, such as acetone or alcohol), by $O_2$ plasma ashing, $O_2$ RIE, or ozone cleaning.

In some embodiments, an etch mask is formed on the surface of intermediate layer 1210 prior to depositing resist layer 1220. Etch masks are provided to prevent etching of layer 1210 by the etchant used to remove portions of the resist layer. Certain oxide materials (e.g., $SiO_2$) are examples of materials suitable for masking intermediate layer 1210 from certain etchants (e.g., reactive ion etchants). For example, a layer of $SiO_2$ can be used to mask a metal layer from a chlorine-based reactive ion etchant. Etch mask layers can be relatively thin (e.g., about 100 nm or less, 50 nm or less, such as in a range from about 20 nm to about 25 nm).

Etching can be performed using commercially-available equipment, such as a TCP® 9600DFM (available from Lam Research, Fremont, Calif.).

More than one etch step can be used. For example, in some embodiments, a two-step etch is used. An example of a two step etching process for Al is as follows. The first etch is performed using a gas mixture composed of $BCl_3$ (e.g., at about 90 sccm), $Cl_2$ (e.g., at about 30 sccm), $N_2$ (e.g., at about 10 sccm), He (e.g., at about 10 Torr) for backside cooling. The radio frequency (RF) power is about 500 W and the chamber pressure about 5 mtorr. The second etch is performed using $Cl_2$ (e.g., at about 56 sccm), HCl (e.g., at about 14 sccm), $N_2$ (e.g., at about 35 sccm), $H_2$ (e.g., at about 10 Torr) for back side cooling. The RF power is about 300 W and the chamber pressure is about 7 mtorr. For a typical 150 nm deep aluminum etching, the first etching time can be about 4 seconds and the second etching time can be about 15 seconds.

In certain embodiments, a post-etching passivation step can be employed to provide a passivation layer on the surface of the etched layer. Post-etching passivation can be done, for example, by exposing the etched layer to an oxidant to produce an oxide layer at the surface of the etched layer. Post-etch passivation of an etched Al layer, for example, can be performed by exposing the etched layer to water vapor at an elevated temperature (e.g., at about 200° C. or more, about 250° C. or more, about 300° C. or more).

Figure 11I:
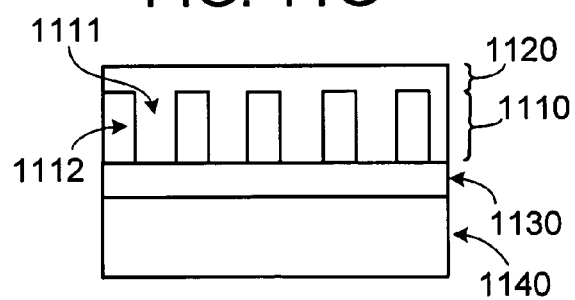

Referring to FIG. 11I, after removing residual resist, material is deposited onto the article, filling trenches 1212 and forming cap layer 1120. The filled trenches correspond to portions 1111 of sub-wavelength structured layer 1110. Material can be deposited onto the article in a variety of ways, including sputtering, electron beam evaporation, CVD (e.g., high density CVD) or atomic layer deposition (ALD). Note that where cap layer 1120 is formed and trenches 1212 are filled during the same deposition step, portions 1111 and cap layer 1120 are formed from a continuous portion of material.

In some embodiments, cap layer 1120 can be removed prior to forming the diffractive layer. Cap layer can be planarized or removed by polishing (e.g., chemical mechanical polishing), ion milling, or etching the surface of the cap layer. Once the cap layer is removed, the diffractive grating layer can be formed by etching a diffractive structure into sub-wavelength structured layer 1110, and filling the trenches of diffractive structure with an isotropic material. Alternatively, a second sub-wavelength structured layer can be formed the exposed surface of layer 1110 or on the surface of cap layer 1120. The diffractive layer can be formed in the second sub-wavelength structured layer as described.

Methods can include other processes in addition to those described. For example, in some embodiments, directional deposition process can be used to deposited one or more materials onto a trench wall in an etched material. Directional deposition can be achieved by evaporation (e.g., electron beam or thermal evaporation) or sputtering while orienting the substrate at a non-normal angle with respect to the deposition material source. Material deposited on top of trench walls can be removed in a subsequent step (e.g., using etching or chemical mechanical polishing).

In some embodiments, multiple polarizers can be prepared simultaneously by forming a relatively a large structure comprising sub-wavelength structures and diffractive structures on a single substrate, which is then diced into individual units. For example, a structure can be formed on a substrate that has a single-side surface area about 10 square inches or more (e.g., a circular substrate with a four inch, six inch, or eight inch diameter substrate). After forming the structure, the substrate can be diced into multiple units of smaller size (e.g., having a single-side surface area of about one square inch or less).

In embodiments, polarizers may be combined with one or more optical components and/or incorporated into a variety of different devices and systems. As an example, a polarizer may be fabricated with a cap layer having a surface adjacent to the diffractive grating layer that is highly reflective of radiation at a wavelength λ. The polarizer may be configured to transmit radiation polarized in one direction, such as TM-polarized radiation, and to block radiation polarized in an orthogonal direction, such as TE-polarized radiation. By fabricating the polarizer with a reflective cap layer, TM-polarized radiation is transmitted by the polarizer, reflects from the surface of the cap layer, and then passes back through the polarizer in the opposite direction and emerges from the same interface that radiation originally entered the polarizer. The addition of a reflective cap layer converts the polarizer from a transmission-only polarizer to a reflection-only polarizer.

In certain applications, a polarizer may be constructed atop an optically non-reciprocal substrate such as, for example, a rotation garnet. Polarizers fabricated in this way may be used in beam isolation applications to replace standard polarizers in, for example, Faraday rotators.

Figure 12:
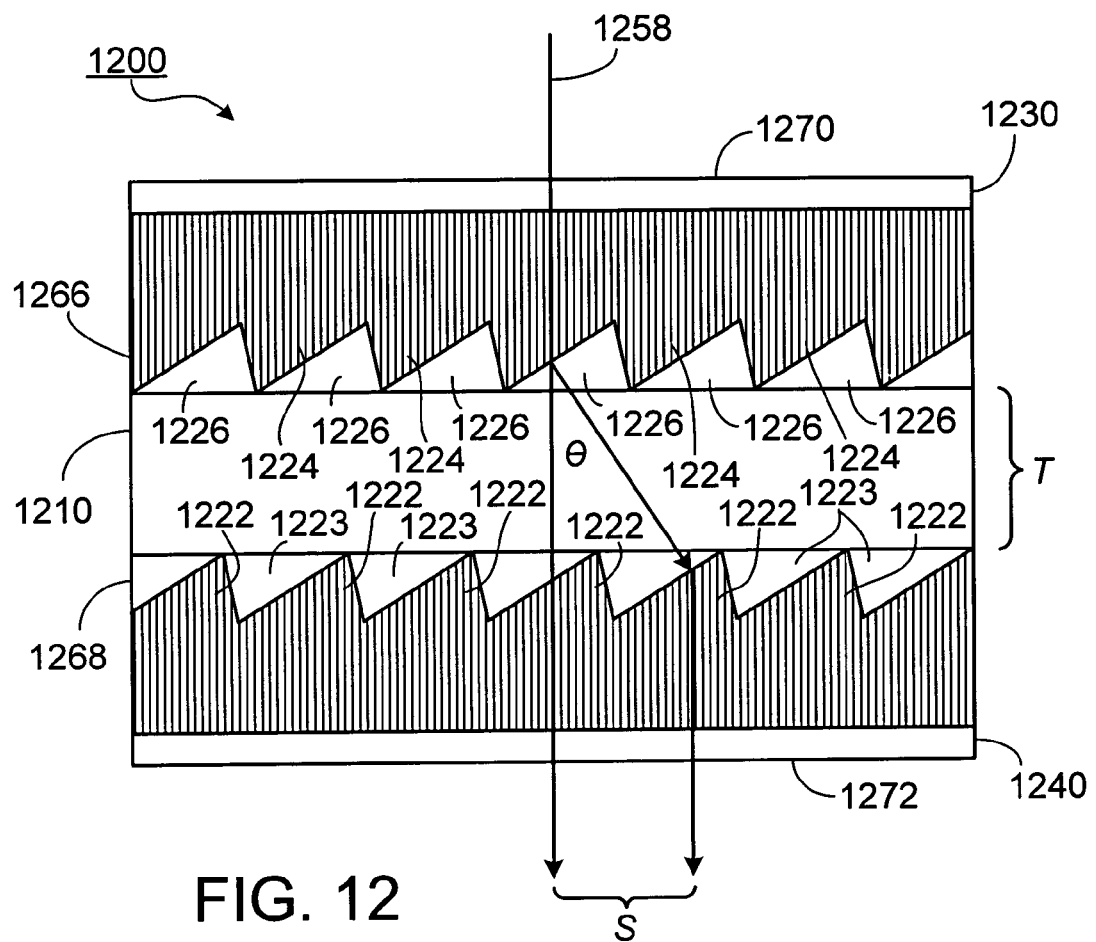
FIG. 12 is a schematic diagram of an embodiment of a walk-off polarizing beamsplitter.

Polarizers may also be used to spatially separate orthogonal polarization components of an incident radiation beam. Polarizers performing this function may be referred to as walk-off polarizers. FIG. 12 shows an example of a walk-off polarizer 1200 that includes two diffractive layers, 1266 and 1268, having portions 1222 and 1224 that include sub-wavelength structure, and portions 1223 and 1226 that are homogeneous. Diffractive layers 1266 and 1268 are disposed on opposing sides of a substrate 1210.

A radiation beam 1258 incident along the z-direction and including TM- and TE-polarized components is directed to a surface 1270 of polarizer 1200. Layers 1266 and 1268 are configured to transmit TM-polarized radiation in a direction that is substantially unchanged, i.e., parallel the z-direction. TE-polarized radiation is diffracted by layer 1266 at an angle θ to the z-axis. Layer 1268, having a structure and composition similar to layer 1266 but positioned in the opposite sense with respect to the TE-polarized radiation, diffracts the TE-polarized beam so that the beam emerges from surface 1272 of polarizer 1260 propagating nominally along the z-direction, but spatially displaced from the TM-polarized beam. The separation of the two beams, s, exiting the device can vary depending on the thickness of the substrate, T, in addition to diffraction angle θ. In embodiments, walk-off polarizer 1200 can include antireflection films 1230 and 1240 to reduce reflection of incident radiation from the polarizer.

Figure 13:
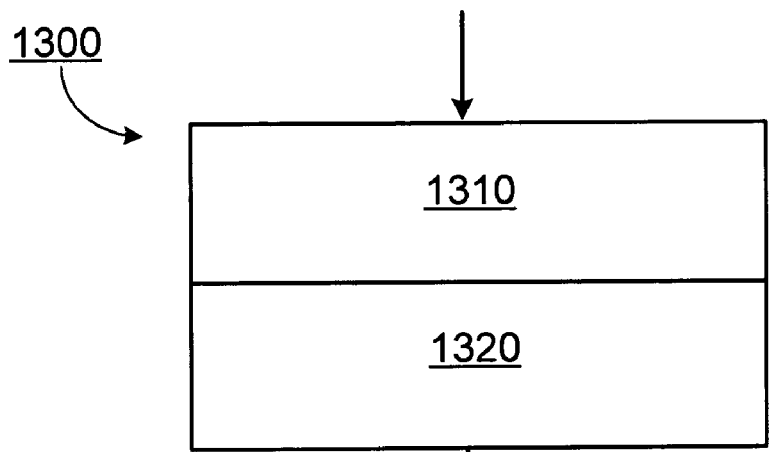
FIG. 13 is a schematic diagram of an embodiment of a polarizer device that includes a reflective polarizer.

Referring to FIG. 13, in some embodiments, a reflective polarizer 1310 can be combined with another polarizer 1320, such as an absorbing polarizer, to provide a polarizing device 1300 with enhanced pass state extinction ratio compared to reflective polarizer 1310. Polarizer 1320 increases pass state extinction by absorbing substantially all of the block state radiation transmitted by reflective polarizer 1310.

Figure 14:
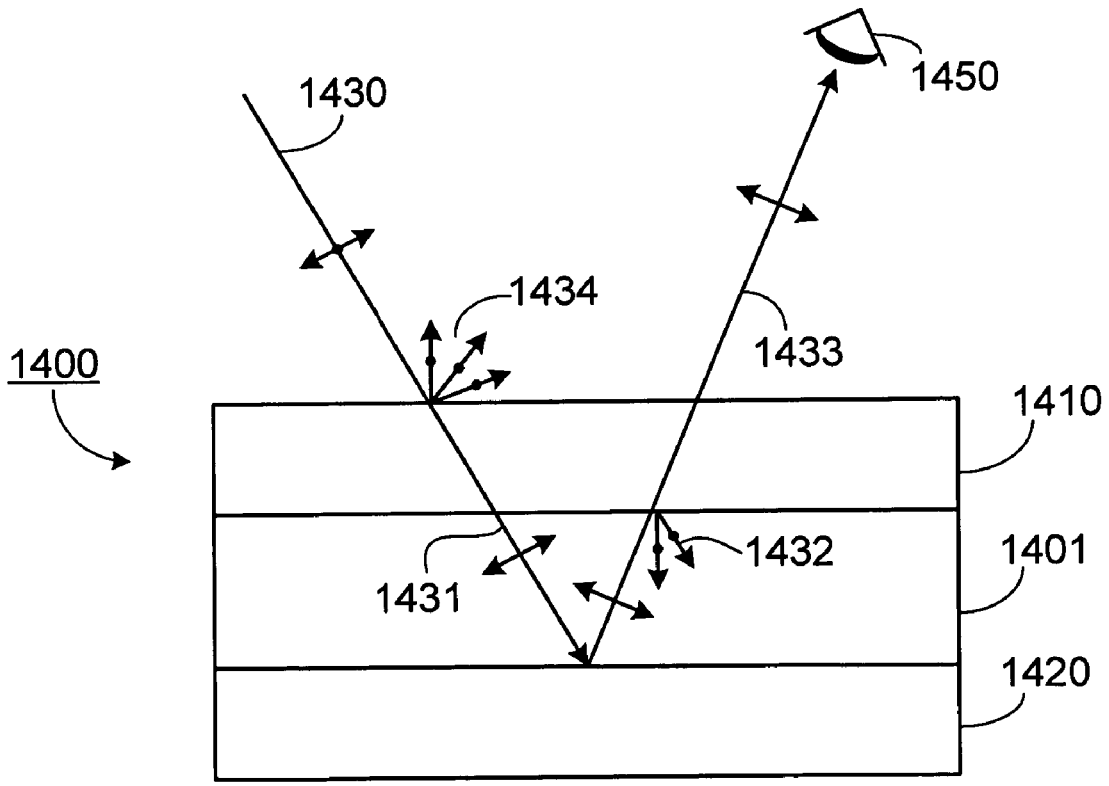
FIG. 14 is a schematic diagram of an embodiment of a liquid crystal display that includes a reflective polarizer.

Referring to FIG. 14, in some applications, a reflective polarizer 1410 can be used as the top polarizer of a reflective liquid crystal display (LCD) 1400. In addition to reflective polarizer 1410, LCD 1400 includes a reflective substrate electrode 1420, and a liquid crystal (LC) layer 1401. The reflective polarizer transmits substantially only the pass state component 1431 of incident ambient light 1430. This pass state light is specularly reflected by substrate electrode 1420. LC layer retards the transmitted light by a variable amount, depending upon the desired brightness of each particular element (e.g., pixel) of the display. If a dark element is desired, the LC retards the transmitted light so that when the light reflected by the substrate electrode reaches reflective polarizer 1410, it is in the block state and diffusely reflected back towards the substrate electrode, as denoted by rays 1432. However, where a bright element is desired, the light reflected by the substrate electrode is in the pass state at reflective polarizer 1410. This light 1433 is transmitted by polarizer 1410 and propagates to an observer 1450. Note that block state ambient light 1434 is diffusely reflected by reflective polarizer 1410, reducing glare to observer 1450.

As mentioned previously, in certain applications, wire-grid polarizers can be used as components in optical isolators. Optical isolators are passive, non-reciprocal devices that typically utilize magneto-optic polarization rotation to isolate a radiation source from reflections in an optical system. In conventional optical isolators, polarization rotation is performed using a Faraday rotator using, for example, Yttrium Iron Garnet (YIG) or Terbium Gallium Garnet (TGG) single crystals. These, among other Faraday media have the ability, when in an appropriate magnetic field, to rotate the plane of linearly polarized light by an amount proportional to the crystals length. YIG crystal is used for wavelengths from about 1,100 to about 2,100 nm. TGG is typically used in free space optical isolators for wavelengths between about 500 nm to about 1,100 nm.

Figure 15:
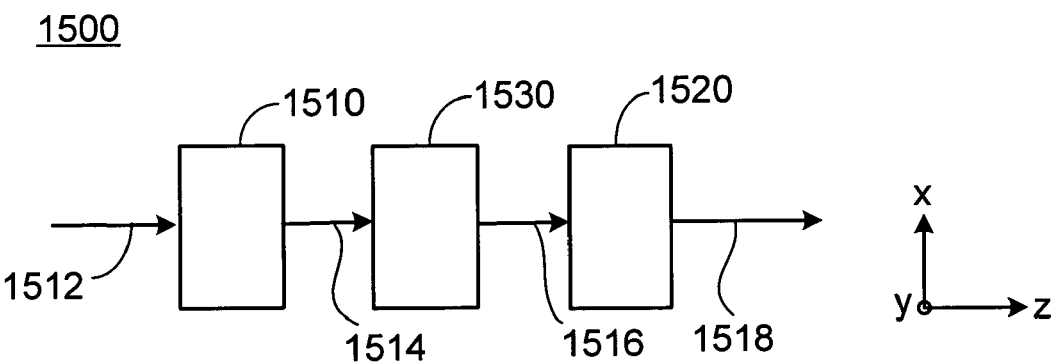
FIG. 15 is a schematic diagram of an embodiment of an optical isolator.

Referring to FIG. 15, an optical isolator 1500 includes a first wire-grid polarizer 1510 and a second wire-grid polarizer 1520. Both the first and second polarizers include diffractive structure to reduce specular reflection of block state radiation. First polarizer 1510 has its pass axis oriented parallel to the y-axis, while second polarizer 1520 has its pass axis oriented in the x-y plane at about 45° with respect to the y-axis. A Faraday rotator 1530, such as a YIG crystal in a magnetic field, is positioned between first polarizer 1510 and second polarizer 1520. Faraday rotator 1530 is configured to rotate by 45° the polarization state of linearly polarized radiation at λ incident radiation propagating parallel to the z-axis.

Optical isolator 1500 is configured to reduce specular reflection of radiation polarized parallel to the x-axis for radiation at λ incident on the optical isolator propagating along path 1512. The amount of reflected radiation polarized parallel to the x-axis is reduced as follows. First, radiation polarized parallel to the x-axis is in the block state of polarizer 1510, so specular reflection of this polarization state from polarizer 1510 is relatively small (e.g., about 2% or less, about 1% or less). Block state polarization transmitted by polarizer 1510 propagates along path 1514 and is rotated by 45° during its passage through Faraday rotator 1530. Thus, this radiation emerges from Faraday rotator 1530 along path 1516 polarized in the block state of second polarizer 1520. Specular reflection of block state radiation from polarizer 1520 is relatively small (e.g., about 2% or less, about 1% or less), so only a small amount of block state radiation is reflected by polarizer 1520 back towards Faraday rotator 1530. Faraday rotator 1530 rotates block state radiation reflected by polarizer 1520 so that it emerges from Faraday rotator 1530 polarized parallel to the y-axis, and is passed by polarizer 1510.

Radiation polarized parallel to the y-axis propagating along path 1512 is substantially transmitted by polarizer 1510, rotated by 45° by Faraday rotator 1530, and substantially transmitted by polarizer 1530 along path 1518. Thus, optical isolator 1500 substantially transmits radiation at λ polarized parallel to the y-axis incident on the isolator along path 1512, while reflecting substantially no radiation polarized parallel to the x-axis.

While polarizers 1510 and 1520 are shown as physically separated from Faraday rotator 1530 (e.g., as a free space optical isolator), other constructions are also possible. For example, in some embodiments, one or both of the polarizers can be physically attached to a surface of the Faraday rotator. For example, one or both of the polarizers can be bonded to a corresponding surface of the Faraday rotator. In some embodiments, a polarizer can be formed on one or more surfaces of the Faraday rotator. For example, a YIG crystal can be used as a substrate for a polarizer.

Furthermore, while both polarizers 1510 and 1520 are wire-grid polarizers with both sub-wavelength and diffractive structure, in general, one of the polarizers can be a different type of polarizer. For example, one of the polarizers can be an absorptive polarizer or a reflective polarizer (e.g., a wire-grid polarizer without diffractive structure).

Figure 16:
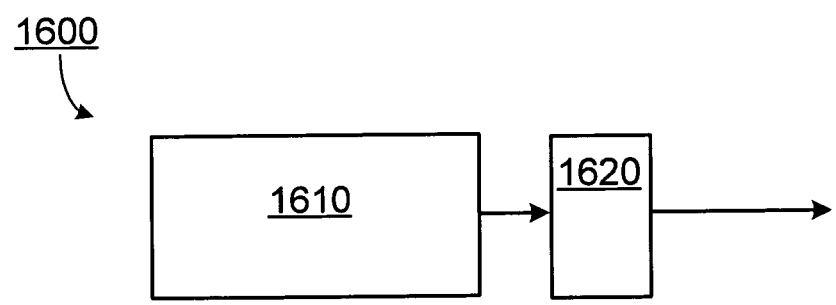
FIG. 16 is a schematic diagram of an embodiment of an optical system including an optical isolator.

Isolators, such as isolator 1500, can be used in a variety of different devices. For example, referring to FIG. 16, in some embodiments, an isolator 1610 is used in a laser system 1600. Laser system 1600 includes a laser source 1620 (e.g., a laser diode) and isolator 1610 positioned at the output of the laser source. Isolator 1610 can reduce the amount of radiation of one polarization state reflected back into the laser source. In some embodiments, isolator 1610 is optically coupled to laser source 1620. In certain embodiments, isolator 1610 is physically attached to laser source 1610.

Various structures and devices that utilize these structures can be used for systems involving high power laser beam delivery systems. For example, devices and structures can be used in short-pulse and/or high repetition rate laser beam isolation at UV or visible spectrum.

EXAMPLE

A polarizer is prepared by first depositing an approximately 50 nm thick etch-stop layer of $HfO_2$ and approximately 450 nm thick $SiO_2$ onto a surface of a BK7 substrate by ion-assisted e-beam evaporation (IAD). Next, the $SiO_2$ layer is patterned into a 200 nm-period grating by imprint lithography and reactive ion etching (RIE), using $CHF_3$ and $O_2$. The $SiO_2$ layer is etched through its entire thickness, down to the $HfO_2$ interface. In a subsequent process step, a 3 nm wide chromium (Cr) layer is deposited onto one side of the $SiO_2$ trench walls. A 22 nm wide gold layer is the deposited onto the chromium layers. The chromium and gold layers are deposited using e-beam evaporation in which the substrate is oriented at approximately 22° with respect to the metal source. The depth of the chromium/gold portions extend about 450 nm in thickness along and over the $SiO_2$ grating trench walls.

After gold deposition, a $SiO_2$ layer is deposited over the grating structure using atomic layer deposition (ALD), providing an approximately 105 nm thick planarization layer over the grating layer. The ALD process corresponds to the process described by J. Wang et al., in the article, "High-performance optical retarders based on all-dielectric immersion gratings," Optics Lett., 30, 1864-1866, (2005). The $SiO_2$ planarization layer is etched back to the top surface of the grating layer using RIEr. Ion milling is used to remove gold and chromium that deposits on top of the trench walls. Subsequently, the grating layer is a monolithic layer having a thickness of approximately 370 nm and having sub-wavelength structure for wavelengths in the 1,200 nm to 1,700 nm range.

By using the same process as described above, a second layer of the above sub-wavelength structure, approximately 260 nm in thickness, is formed on top of the first layer. Periodic parallel trenches are etched into the monolithic sub-wavelength structured layer using a photolithographic exposure and reactive-ion etch. These trenches have a depth of approximately 260 nm and a width of approximately 2.4 μm wide. The trenches are separated by rows of material having the sub-wavelength grating structure that are approximately 2.4 μm wide. The trenches extend in a direction substantially orthogonal to the gold rows in the sub-wavelength structure. The trenches are filled with $AlSiO_x$ having a refractive index of approximately 1.56 in the 1,200 nm to 1,700 nm wavelength range, providing a monolithic grating layer having a diffractive structure in that wavelength range. The $AlSiO_x$ is deposited as a nanolaminate material in the trenches using ALD. The structure is then planarized using chemical mechanical polishing resulting in a layer of $AlSiO_x$ having a thickness of approximately 105 nm with a substantially planar surface on top of the second layer of sub-wavelength structure, providing, in addition, a monolithic grating layer having diffractive structure for light in the 1,200 nm to 1,700 nm range. A layer of $HfO_2$, approximately 105 nm thick, is deposited onto the $AlSiO_x$ layer using IAD e-beam evaporation. Finally, a layer of $SiO_2$, approximately 330 nm thick, is deposited onto the layer of $HfO_2$.

The surface of the BK7 substrate opposite the grating layer is coated with an antireflection film. The antireflection film is composed of a first $Ta_2O_5$ layer, 70 nm thick, adjacent the substrate surface, a first $SiO_2$ layer 70 nm thick adjacent the first $Ta_2O_5$ layer, a second $Ta_2O_5$ layer 209 nm thick adjacent the first $SiO_2$ layer, and a second $SiO_2$ layer 262 nm thick. The coatings are formed using the same method as for the etch stop layer.

Figure 17:
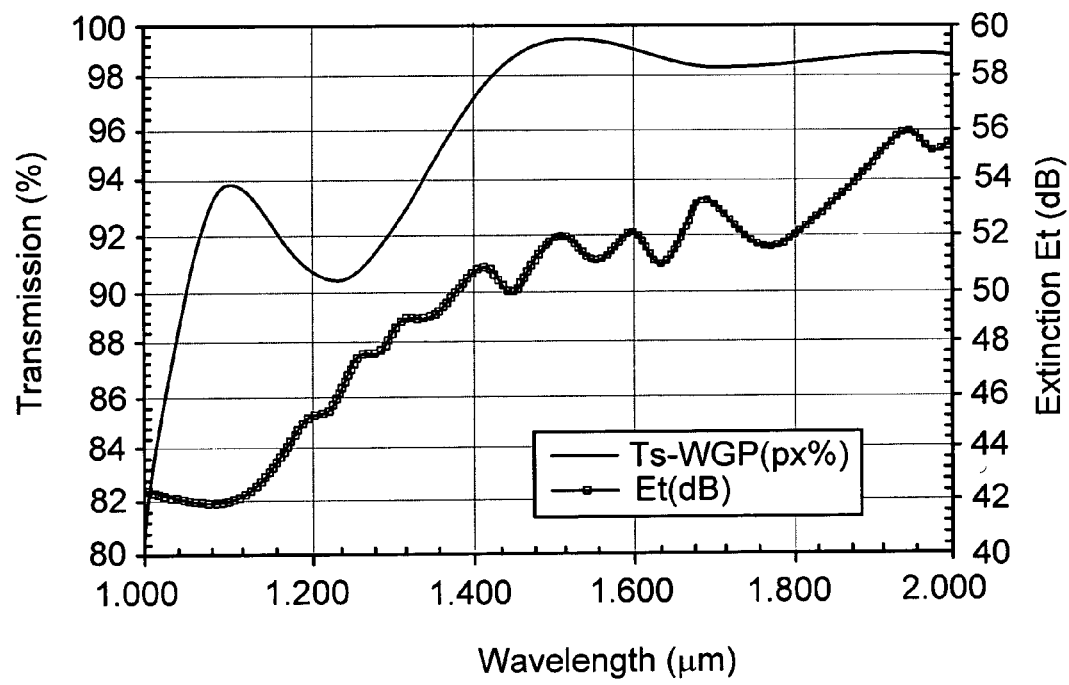
FIG. 17 is a plot showing a modeled transmission spectrum for an example embodiment of a polarizer.
Figure 18:
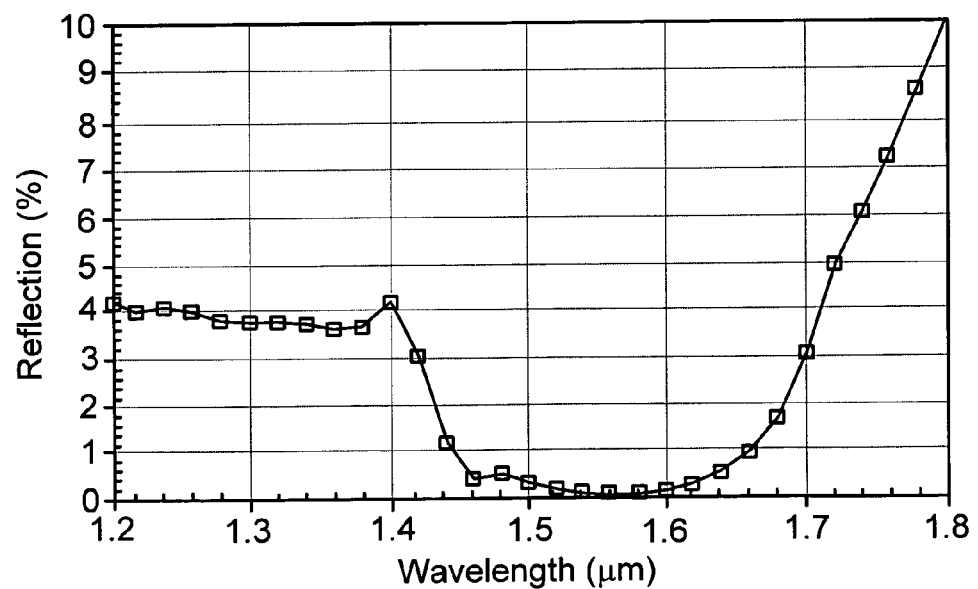
FIG. 18 is a plot showing a modeled reflection spectrum for the example embodiment of a polarizer.

The performance of the polarizer is illustrated in FIGS. 17 and 18. FIG. 17 shows modeled transmission of TM (pass state) radiation and extinction in transmission of TE (block state) radiation at different wavelengths for radiation normally incident on the grating side of the polarizer. Pass state transmission, labeled Ts-WGP(p)(%) in FIG. 17, is relatively high for radiation in about the 1,200 nm to 2,000 nm range (e.g., about 90% or more), with particularly high transmission (e.g., about 98% or more) for radiation in about the 1,400 nm to 2,000 nm range. Correspondingly, extinction of block state radiation, labeled Et(dB), is relatively high at these wavelengths, e.g., about 45 dB or more for radiation in about the 1,200 nm to 2,000 nm range.

FIG. 18 shows modeled reflection of TE (block state) radiation at different wavelengths for radiation normally incident on the grating side of the polarizer. The polarizer has relatively low reflection of block state radiation. For example, the polarizer has a reflectance of about 5% or less for radiation in about the 1,200 nm to 1,600 nm range.

The data shown in FIGS. 17 and 18 was modeled using a hybrid model. In this model, the effective indices of the sub-wavelength grating are calculated by using effective medium theory. Effective medium theory is discussed, for example, by H. Kikuta et al., in "Achromatic quarter-wave plates using the dispersion of form birefringence," Applied Optics, Vol. 36, No. 7, pp. 1566-1572 (1997), by C. W. Haggans et al., in "Effective-medium theory of zeroth order lamellar gratings in conical mountings," J. Opt. Soc. Am. A, Vol. 10, pp 2217-2225 (1993), and by H. Kikuta et al., in "Ability and limitations of effective medium theory for subwavelength gratings," Opt. Rev., Vol. 2, pp. 92-99 (1995). After calculating the effective indices of the sub-wavelength grating, the performance of the diffractive optical structures are calculated by rigorous coupled wave analysis, as discussed by X. Deng, et al. in the article, "Multiscale structures for polarization control by using imprint and UV lithography," Proc. SPIE, Vol. 6003, (2005), Boston, Mass.

Other embodiments are in the claims.

What is claimed is:

1. An article, comprising:
a first layer including a plurality of rows of a first material extending along a first direction, the rows being spaced apart from each other and a center of each adjacent row being separated by a distance less than a wavelength λ; and
a second layer supported by the first layer, the second layer comprising a second material,
wherein the first layer is configured to transmit about 50% or more of radiation of the wavelength λ having a first polarization state incident on the first layer along a path and to specularly reflect about 80% or more of radiation of the wavelength λ having a second polarization state incident on the first layer along the path, the first and second polarization states being orthogonal, and
the second layer is configured so that the article specularly reflects about 10% or less of the radiation of the wavelength λ having the second polarization incident on the article along the path, where the path intersects the first and second layers,
wherein the second layer comprises a plurality of portions comprising the second material, the portions being spaced apart from each other and a center of each adjacent portion being separated by a distance more than the wavelength λ.

2. The article of claim 1, wherein the plurality of portions of the second material extend along a second direction.

3. The article of claim 2, wherein the rows comprising the second material have a width of about 1 μm or more.

4. The article of claim 1, wherein the center of adjacent portions are separated by a distance of about 1 μm or more.

5. The article of claim 1, wherein the plurality of portions in the second layer each comprise a plurality of rows of the second material extending along the first direction, the rows of the second material being spaced apart from each other.

6. The article of claim 5, wherein the center of each adjacent row of the second material is separated by a distance of about 400 nm or less.

7. The article of claim 5, wherein the rows of the first material in the first layer are continuous with the rows of the second material in the second layer.

8. The article of claim 1, wherein the second layer has a thickness of about 1,000 nm or less.

9. The article of claim 1, wherein the first and second materials are different.

10. The article of claim 1, wherein the second material is a dielectric material.

11. The article of claim 1, wherein the second material is a metallic material.

12. The article of claim 1, wherein portions of the second layer between the portions comprising the second material comprise a third material different from the second material.

13. The article of claim 12, wherein the third material is a dielectric material.

14. The article of claim 13, wherein the second material is a metallic material.

15. The article of claim 13, wherein the third material has a refractive index at the wavelength $\lambda$ that is approximately equal to an effective refractive index of the rows comprising the second material for radiation of the wavelength $\lambda$ having the second polarization state propagating along the axis.

16. The article of claim 13, wherein the second layer is a continuous layer.

17. The article of claim 1, wherein the second layer is configured so that the article specularly reflects about 8% or less of the radiation of the wavelength $\lambda$ having the second polarization incident on the article along the path.

18. The article of claim 1, wherein the first material is a dielectric material.

19. The article of claim 1, wherein the first material is a metallic material.

20. The article of claim 19, wherein the first layer comprises a plurality of rows of a dielectric material extending along the first direction, the rows of the dielectric material alternating with the rows of the first material.

21. The article of claim 1, wherein the rows of the first material have a width of about 200 nm or less.

22. The article of claim 1, wherein each adjacent row of the first material is separated by a trench having a width in a range from about 50 nm to about 300 nm.

23. The article of claim 1, wherein the first layer has a thickness of about 10 nm or more.

24. The article of claim 1, wherein the first layer has a thickness of about 1,000 nm or less.

25. The article of claim 1, wherein the first and second layers have a combined thickness of about 5 μm or less.

26. The article of claim 1, further comprising a third layer between the first layer and the second layer.

27. The article of claim 1, wherein the first and second layers are separated by a distance of about 5 μm or less.

28. The article of claim 1, wherein the first layer is a continuous layer.

29. The article of claim 1, wherein the first layer transmits about 80% or more of radiation of the wavelength $\lambda$ having the first polarization state incident on the layer along the path.

30. The article of claim 1, wherein the first layer blocks about 90% or more of radiation of the wavelength $\lambda$ having the second polarization state incident on the layer along the path.

31. The article of claim 1, wherein the wavelength $\lambda$ is between about 150 nm and about 5,000 nm.

32. The article of claim 1, wherein the first layer transmits about 50% or more of radiation of the wavelength $\lambda$ having a first polarization state incident on the layer along the path and the first layer blocks about 80% or more of radiation of wavelength $\lambda'$ having a second polarization state incident on the layer along the path, wherein $|\lambda-\lambda'|$ is about 50 nm or more.

33. An apparatus comprising a Faraday rotator and the article of claim 1 positioned relative to the Faraday rotator so that the path intersects the Faraday rotator.

34. The apparatus of claim 33 further comprising a polarizer, wherein the Faraday rotator is positioned between the article and the polarizer.

35. The apparatus of claim 33 wherein the apparatus comprises an optical isolator including the Faraday rotator and article.

36. An article, comprising:
a first layer supported by a substrate, the first layer including a plurality of rows of a first material extending along a first direction, the rows being spaced apart from each other and a center of each adjacent row being separated by a distance less than a wavelength $\lambda$;
wherein the first layer is configured to transmit about 50% or more of radiation of the wavelength $\lambda$ having a first polarization state incident on the first layer along a path and to specularly reflect about 80% or more of radiation of the wavelength $\lambda$ having a second polarization state incident on the first layer along the path, the first and second polarization states being orthogonal; and
a second layer supported by the first layer, the second layer comprising a plurality of rows comprising a second material extending along a second direction, the rows being spaced apart from each other and a center of each adjacent row being separated by a distance more than the wavelength $\lambda$,
wherein the wavelength $\lambda$, is in a range from about 150 nm to about 5,000 nm.

37. An article, comprising:
a first layer including a plurality of rows of a first material extending along a first direction, the rows being spaced apart from each other and a center of each adjacent row being separated by a distance less than a wavelength $\lambda$; and
a second layer supported by the first layer, the second layer comprising a second material,
wherein the first layer is configured to transmit about 50% or more of radiation of the wavelength $\lambda$ having a first polarization state incident on the first layer along a path and to specularly reflect about 80% or more of radiation of the wavelength $\lambda$ having a second polarization state incident on the first layer along the path, the first and second polarization states being orthogonal,
the second layer is configured so that the article specularly reflects about 10% or less of the radiation of the wavelength $\lambda$ having the second polarization incident on the article along the path, where the path intersects the first and second layers, and
the second layer comprises a plurality of portions comprising the second material, the portions being spaced apart from each other and a center of each adjacent portion being separated by a distance of about 1 μm or more.

38. An article, comprising:
a first layer including a plurality of rows of a first material extending along a first direction, the rows being spaced apart from each other and a center of each adjacent row being separated by a distance less than a wavelength $\lambda$; and a second layer supported by the first layer, the second layer comprising a second material, wherein the first layer is configured to transmit about 50% or more of radiation of the wavelength $\lambda$ having a first polarization state incident on the first layer along a path and to specularly reflect about 80% or more of radiation of the wavelength $\lambda$ having a second polarization state incident on the first layer along the path, the first and second polarization states being orthogonal, the second layer is configured so that the article specularly reflects about 10% or less of the radiation of the wavelength $\lambda$ having the second polarization incident on the article along the path, where the path intersects the first and second layers, the first material is a metallic material, and the first layer comprises a plurality of rows of a dielectric material extending along the first direction, the rows of the dielectric material alternating with the rows of the first material.

* * * * *

UNITED STATES PATENT AND TRADEMARK OFFICE
CERTIFICATE OF CORRECTION

PATENT NO. : 7,619,816 B2 Page 1 of 1
APPLICATION NO. : 11/265813
DATED : November 17, 2009
INVENTOR(S) : Xuegong Deng et al.

It is certified that error appears in the above-identified patent and that said Letters Patent is hereby corrected as shown below:

Column 28, line 36, Claim 36, delete "λ," and insert --λ--.

Signed and Sealed this

Sixteenth Day of March, 2010

David J. Kappos
*Director of the United States Patent and Trademark Office*